United States Patent [19]
Vassiliadis et al.

[11] Patent Number: 5,337,395
[45] Date of Patent: Aug. 9, 1994

[54] SPIN: A SEQUENTIAL PIPELINE NEUROCOMPUTER

[75] Inventors: Stamatis Vassiliadis, Vestal; Gerald G. Pechanek, Endwell; Jose G. Delgado-Frias, Vestal, all of N.Y.

[73] Assignee: International Business Machines Corporation, Armonk, N.Y.

[21] Appl. No.: 681,842

[22] Filed: Apr. 8, 1991

[51] Int. Cl.$^5$ .............................................. G06F 15/18
[52] U.S. Cl. ........................................ 395/27; 395/11
[58] Field of Search ................................. 395/27, 11

[56] References Cited

U.S. PATENT DOCUMENTS

| | | | |
|---|---|---|---|
| 4,897,814 | 1/1990 | Clark | 365/49 |
| 4,994,982 | 2/1991 | Duranton et al. | 364/513 |
| 5,040,134 | 8/1991 | Park | 364/602 |
| 5,075,889 | 12/1991 | Jousselin et al. | 365/73 |
| 5,091,864 | 2/1992 | Baji et al. | 395/27 |
| 5,115,492 | 5/1992 | Engeler | 395/27 |

OTHER PUBLICATIONS

Stone, H. S., High-Performance Computer Architecture, Addison-Wesley, 1987, 102-115.
Rumelhardt et al., "Parallel Distributed Processing, vol. 1: Foundation", Cambridge, Mass.:MIT Press 1986.
J. Hopfield, "Neurons with Graded Response Have Collect . . . ", Proceedings of Nat'l Acad. of Sci., pp. 3088, 3092, May 1984.
S. Kung et al., "A Unified Systolic Arch. for Articial . . . ", Journal of Parallel and Dist. Computer, pp. 358-387, 1989.
P. Treleaven et al., "Neural Networks on Silicon", IFIP, Jun. 1989, pp. 1-10, Elsevier Science Publishers, B.V., 1990.
J. Hopfield & D. Tank, "Neural Computation of Decisions in Optimization Problems", pp. 141, 152, 1985.
Implementing Neural Nets with Programmable Logic; Vidal IEE Trans. on Acoustics . . . , vol. 36, No. 7, pp. 1180-1190, Jul. 1988.
Design of Parallel Hardware Neural Network Systems . . . , Eberhadt et al.; IJCNN: vol. 2, Jun. 18, 1989, pp. II, 183-190.

*Primary Examiner*—Michael R. Fleming
*Assistant Examiner*—Robert W. Downs
*Attorney, Agent, or Firm*—Lynn L. Augspurger; Eugene I. Shkurko

[57] ABSTRACT

A neural network architecture consisting of input weight multiplications, product summation, neural state calculations, and complete connectivity among the neuron processing elements. Neural networks are modelled using a sequential pipelined neurocomputer producing high performance with minimum hardware by sequentially processing each neuron in the completely connected network model. An N neuron network is implemented using multipliers, a pipelined adder tree structure, and activation functions. The activation functions are provided by using one activation function module and sequentially passing the N input product summations sequentially through it. One bus provides N×N communications by sequentially providing N neuron values to the multiplier registers. The neuron values are ensured of reaching corresponding multipliers through a tag compare function. The neuron information includes a source tag and a valid signal. Higher performance is provided by connecting a number of the neurocomputers in a parallel.

39 Claims, 21 Drawing Sheets

SEQUENTIAL PIPELINED NEUROCOMPUTER - SPIN

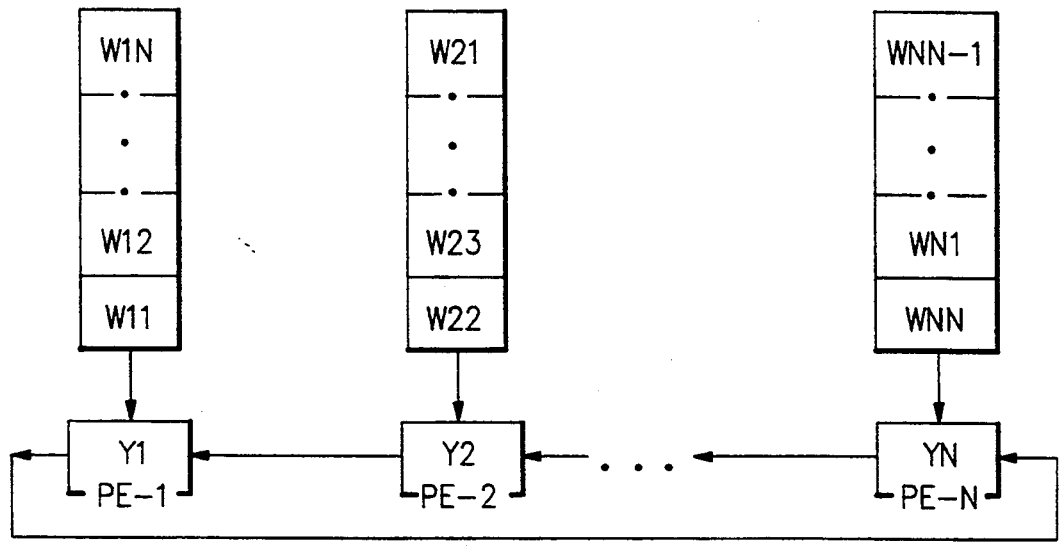

OPERATION SEQUENCE:

| | PE-1 | PE-2 | | PE-N |
|---|---|---|---|---|
| 1 - | Y1*W11 | Y2*W22 | . . . | YN*WNN |
| 2 - | Z1 = Y1*W11 | Z2 = Y2*W22 | . . . | ZN = YN*WNN |
| 3 - | PE-1 ← Y2 | PE-2 ← Y3 | . . . | PE-N ← Y1 |
| 4 - | Y2*W12 | Y3*W23 | . . . | Y1*WN1 |
| 5 - | Z1 = Z1+Y2*W12 | Z2 = Z2+Y3*W23 | . . . | ZN = ZN+Y1*WN1 |
| 6 - | PE-1 ← Y3 | PE-2 ← Y4 | . . . | PE-N ← Y2 |

MULTIPLY, ACCUMULATE, AND SHIFT UNTIL N−1 ACCUMULATE OPERATIONS ARE COMPLETED.

| 7 - | PE-1 ← Y1 | PE-2 ← Y2 | . . . | PE-N ← YN |
| 8 - | Y1' = F(Z1) | Y2' = F(Z2) | . . . | YN' = F(ZN) |
| 9 - | CONTINUE WITH THE NEXT NETWORK UPDATE CYCLE. | | | |

RING SYSTOLIC ARRAY ARCHITECTURE AND OPERATION SEQUENCE FOR NEURAL NETWORKS

FIG.1
Prior Art

SPIN PROCESSING ELEMENT

WEIGHT STORAGE STRUCTURE

VSPIN WEIGHT STORAGE

SEQUENTIAL PIPELINED NEUROCOMPUTER -2:

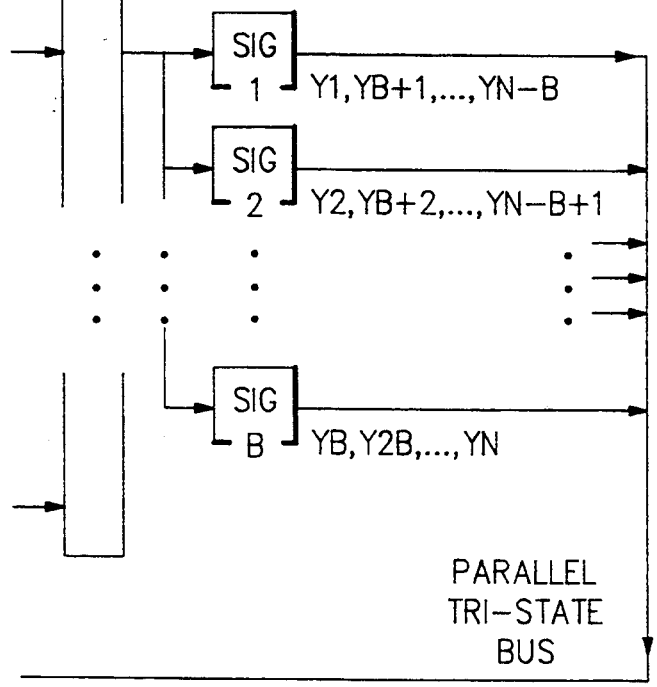
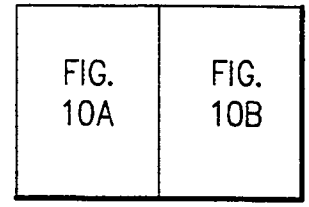
FIG.10
FIG.10B

SPIN-211 PN-2 QUEUE BASED STRUCTURE

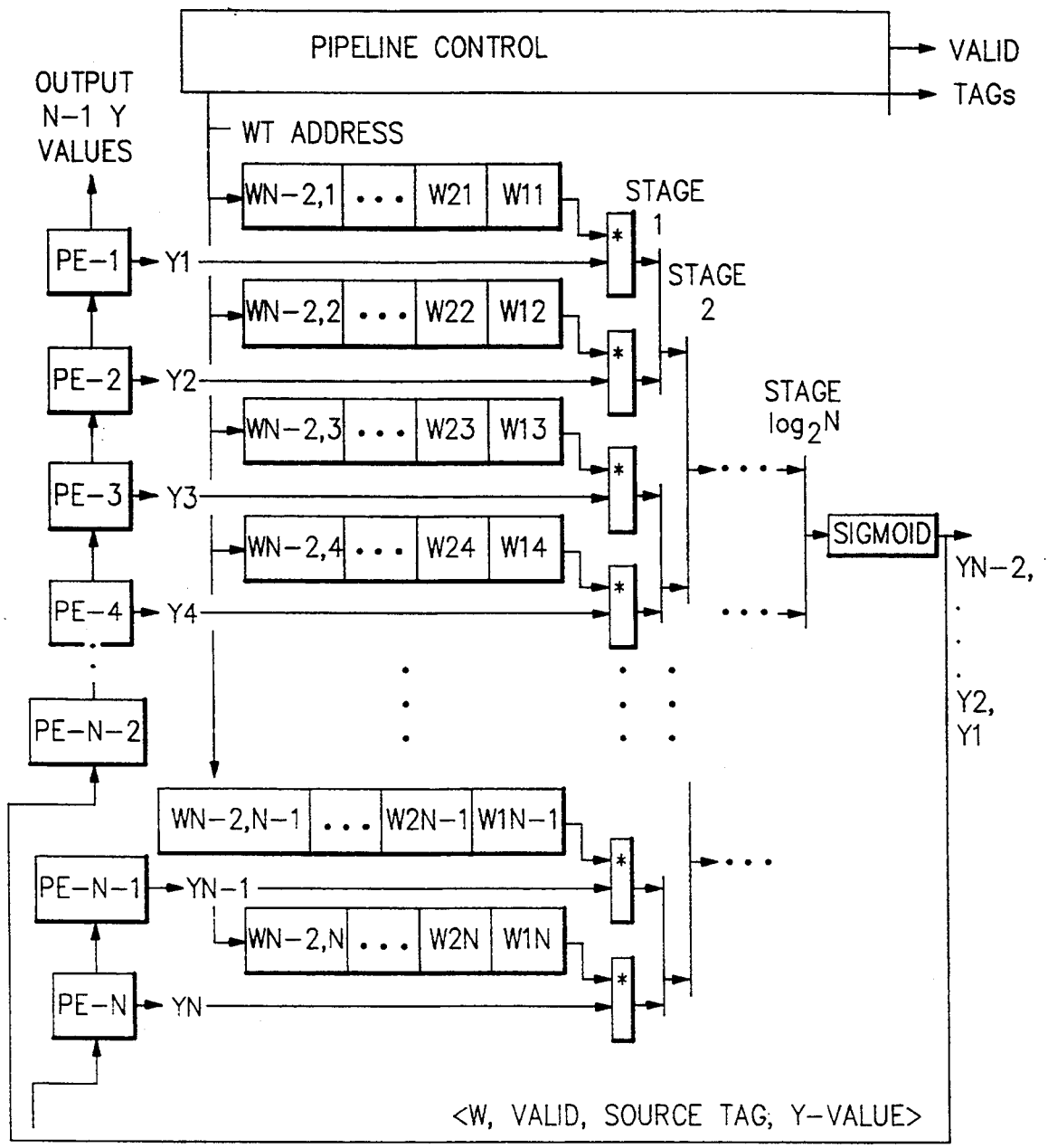

FIG.16B   NEURON PN BUS = <W, VALID, Y-VALUE>

| NETWORK | HARDWARE | | | | | | | | DELAY EQUATION |
|---|---|---|---|---|---|---|---|---|---|
| | INPUT CELLS | | CELLS TOTAL WTS | EXECUTION UNITS | | | | BUS | |
| | # INPUT CELLS | INPUT WTS/CELL | | MPYs | ADDERS | SIG-MOIDS | | | |
| SYSTOLIC RING | N | N | N*N | N | N | N | | 1 | $N\delta_M + \delta_A + \delta_S + \delta_{B1}$ |
| SPIN | N | N | N*N | N | (N−1) | 1 | | 1 | $N\delta_M + (\log_2 N)\delta_A + \delta_S + \delta_{B2} + \delta_{PE}$ |
| SPIN-E | E*N | N/E | N*N | E*N | E*(N−1) | E | | E | $E \leq \delta'_M$ <br> $N/E\delta_M + (\log_2 N)\delta_A + \delta_S + \delta_{B2} + \delta_{PE} + EC$ |
| SPIN-IP | A*N | N/A | N*N | A*N | (N−1) OR A*(N−1) | B | | 1 | $\delta_M + \delta_{mpx} + (\log_2 N)\delta_A + \delta_S + \delta_B + \delta_{PE} + (N-1)C$ |
| SPIN-IP2 | N | N | N*N | N PIPE-LINED | (N−1) | 1 PIPE-LINED | | 1 | $\delta_M + (\log_2 N)\delta_A + \delta_S + \delta_B + \delta_{PE} + (N-1)C$ |
| SPIN-EXP | N+X | VARYS | N*N | N+X | N+X−1 | E | | E | PN−1: <br> $(N-P)\delta_M + (\log_2 N)\delta_A + \delta_S + \delta_{B2} + \delta_{PE}$ <br> PN−2: <br> $P(N/X)\delta_M + (1+\log_2 X)\delta_A + \delta_S + \delta_{B2} + \delta_{PE}$ |

ARCHITECTURE COMPARISON SUMMARY

FIG.17

TABLE 1

| N | RING SYSTOLIC ARRAY NN | SPIN | SPIN-EXP E=2,X=512,P=341 | SPIN-IP | SPIN-E E=64 |
|---|---|---|---|---|---|
| 128 | 8,258 | 8,265 | E=2,X=64,P=24<br>5,577 | 265 | 265 |
| 256 | 16,450 | 16,458 | E=2,X=128,P=85<br>11,018 | 394 | 394 |
| 512 | 32,834 | 32,843 | E=2,X=256,P=170<br>21,963 | 651 | 651 |
| 1024 | 65,602 | 65,612 | E=2,X=512,P=341<br>43,788 | 1,164 | 1,164 |

RING SYSTOLIC ARRAY NN, SPIN, SPIN-EXP, SPIN-IP, AND SPIN-E
PERFORMANCE COMPARISONS

FIG.18

SPIN: A SEQUENTIAL PIPELINE NEUROCOMPUTER

FIELD OF THE INVENTION

The inventions relate to neurocomputer architectures, and particularly to a sequential pipelined neurocomputer.

RELATED APPLICATIONS

This application is related to the following U.S. patent applications the priority of which is claimed herein:

S. Vassiliadis and G. G. Pechanek, U.S. Pat. No. 5,065,339 of Nov. 12, 1991, entitled "Apparatus and Method for Neural Processing" (herein referred to as SNAP), and G. G. Pechanek and S. Vassiliadis, U.S. Ser. No. 07/682,786 Filed Apr. 8, 1991 and entitled "A Triangular Scalable Neural Array Processor" (herein referred to as T-SNAP).

These co-pending applications and the present application are owed by one and the same assignee, namely, International Business Machines Corporation of Armonk, N.Y.

The descriptions set forth in these co-pending applications are hereby incorporated into the present application by reference.

BACKGROUND OF THE INVENTIONS

There are several references which are considered to be relevant to the discussions which are set forth in the Detailed Description of the Inventions, and which are referred to therein as stated after each of the following references. These references are:

D. E. Rumelhart, J. L. McClelland, and the PDP Research Group, .ul Parallel Distributed Processing, Vol. 1: Foundations .eul Cambridge, Mass: MIT Press, 1986,(herein Rumelhart 1986).

J. J. Hopfield, .ul "Neurons With Graded Response Have Collective Computational Properties Like Those of Two-State Neurons," Proceedings of the National Academy of Sciences, .eul pp. 3088,3092, May, 1984, (herein Hopfield 1984).

S. Y. Kung and J. N. Hwang, .ul "A Unified Systolic Architecture for Artificial Neural Networks", Journal of Parallel and Distributed Computing 6, .eul pp. 358-387, 1989, (herein Kung 1989).

P. Treleaven and M. Vellasco, .ul "Neural Networks on Silicon.", .eul in M. Sami and F. Sistante, editor, .ul Wafer Scale Integration, III .eul (IFIP June 1989), pp. 1-10, Elsevier Science Publishers, B.V. (North-Holland), 1990, (herein Treleven, 1990).

J. J. Hopfield and D. W. Tank, .ul "Neural Computation of Decisions in Optimization Problems", .eul pp. 141,152, 1985, (herein Hopfield 1985).

DEFINITION OF TERMS

These definitions relate to various new terms used to discuss the inventions contained herein, and may prove useful in reading the discussions which follow.

SPIN: Sequential Pipelined Neurocomputer
SNAP: Scalable Neural Array Processor
T-SNAP: Triangular Scalable Neural Array Processor
VSPIN: Virtual Sequential Pipelined Neurocomputer
SPIN-E: Sequential Pipelined Neurocomputer-E where E represents the number of parallel merged SPIN structures.
SPIN-IP: Sequential Pipelined Neurocomputer with Increased Parallelism
SPIN-EXP: Sequential Pipelined Neurocomputer-EXP where E represents the number of physical neurons, X the number of replicated input multiplier sections contained in the E-1 additional physical neurons, and P the number of neuron values produced from the additional parallel physical neurons.
PE: Processing Element
PN: Physical Neuron
NN: Neural Network
Sigmoid function is a non linear neuron function which indicates the state of the neuron, and herein throughout providing a single neuron activation function, in the form of the preferred generator, which is termed the sigmoid generator or abbreviated as SIG or S as indicated in the text.
MPX: Multiplexor
M: Multiplier delay
m: Number of neurons in neural network to be emulated by SPIN.
N: Number of physical neurons SPIN supports
R: Number of network update cycles
BI/DI: Bidirectional bus
MEM: size of connection weight memory as used in PS: Partial Summation
TSP: Traveling Salesman Problem
SYNC: Synchronization logic
A: dimensionless number equal to the multiplier clock cycle delay
B: dimensionless number equal to the sigmoid clock cycle delay
L: word width in bits
WTS: weights
MPY: multiply or multiplier

INTRODUCTION

The computational tasks to be implemented by the neurocomputer architectures described in this paper are given by equation 1 and 2 which are based on a subset of the full Parallel Distributed Processing model, see—Rumelhart 1986 and the Hopfield 1985 network.

$$Y_i = F\left(\sum_{j=1}^{N} Y_j W_{ij}\right) \quad (1)$$

Where:

N is the number of neurons in the neural network.

The subscripts on the weights W such as $W_{13}$ is to be interpreted as meaning the weight of the connection from Neuron 3 to Neuron 1.

$Y_j$ is the $j^{th}$ neuron output value connected to the $i^{th}$ neuron input through a connection weight of $W_{ij}$.

F(z) is the neuron activation function which many times is set equal to a sigmoid activation function whose form, for example is:

$$F(z) = \frac{1}{1 + e^{-\frac{2z}{T}}} \quad (2)$$

Where:
For the function $$F(z)z = \sum_{j=1}^{N} Y_j W_{ij}$$

$0 \leq F(z) \leq 1$

T is a global control parameter used to modify the slope of the sigmoid function for a given set of z values.

e = Natural log (2.71828 ...)

Equations 1 and 2, for a completely connected N neuron network, contain four basic operations:

1. $N^2$ Multiplications
2. N Product Summations
3. N Activation Functions
4. N×N communications Learning, typically a basic neurocomputer operation, will not be discussed. The weights will be assumed to be fixed for the duration of a network execution cycle which further assumes the weights are loadable from a HOST computer where the learning algorithms for weight updating would be implemented, if required. The HOST computer also assumes the responsibilities of initializing the network architecture. For example, the HOST computer will be responsible for the loading of the number of neurons in the network to be simulated by the architecture, all the connection weights, the initial neuron values, the number of network update cycles to be run, as well as starting the model into execution. The HOST computer is also provided with the ability to read the neuron values at the completion of network execution. In assessing and comparing the performance of the various neural processing architectures the initialization time and the Host processing time are considered as a separate issue. Only the performance during execution will be considered in this discussion.

While SNAP and T-SNAP each have their own advantages, if hardware costs are of greater concern than performance, the SPIN architecture represents an alternative to the SNAP and T-SNAP architectures at a considerable hardware savings where applicable while still providing performance on par with or better than the ring systolic array neural network. This discussion describes the SPIN architecture and its extensions and provides a performance evaluation and comparison with the ring systolic array neural network (NN) architecture of the Prior Art, as discussed with respect to FIG. 1 hereinafter.

SUMMARY OF THE INVENTIONS

The proposed new architecture SPIN: Sequential Pipelined Neurocomputer, along with SPIN extensions (VSPIN; SPIN-E; SPIN-IP and SPIN-EXP) is an architecture which will have improved performance in the various operations which in the detailed description we will demonstrate for the implementation of the four basic operations contained in Equation 1 and 2 for a completely connected neuron Network. Each of the preferred embodiments will be description with respect to the basic SPIN architecture. SPIN will implement an N neuron network where N represents the number of physical neurons implemented. SPIN provides the multiplication operation by utilizing N multipliers, the N product summations by a pipelined adder tree structure, the N activation functions by utilizing one activation function module and sequentially passing the N neuron input product summations through it, and the N×N communications by utilizing one bus which sequentially provides the N neuron values to the multiplier input registers organized in a shift register fashion. All SPIN architectures are implementable in a bit-serial or by word representation fashion.

For a detailed description of the various preferred embodiment of our inventions, reference should be had to the detailed description which describes the various architectural structures as preferred implementations or embodiments, and to the drawings and table which accompany the description.

BRIEF DESCRIPTION OF THE DRAWINGS AND TABLE

FIG. 1 shows a Prior Art ring systolic array architecture and operation sequence for neural networks.

Figure 9A:
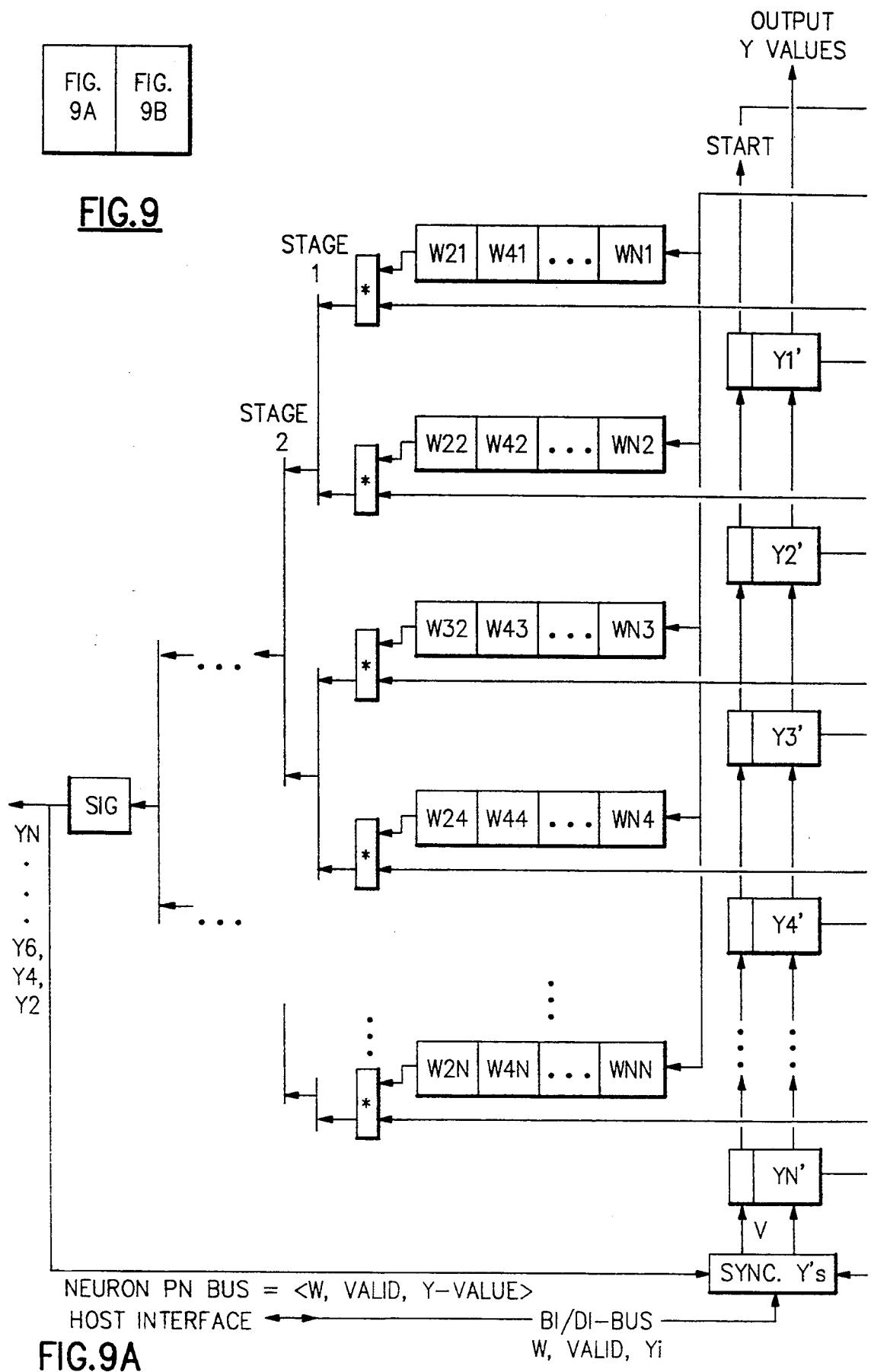
Figure 9B:
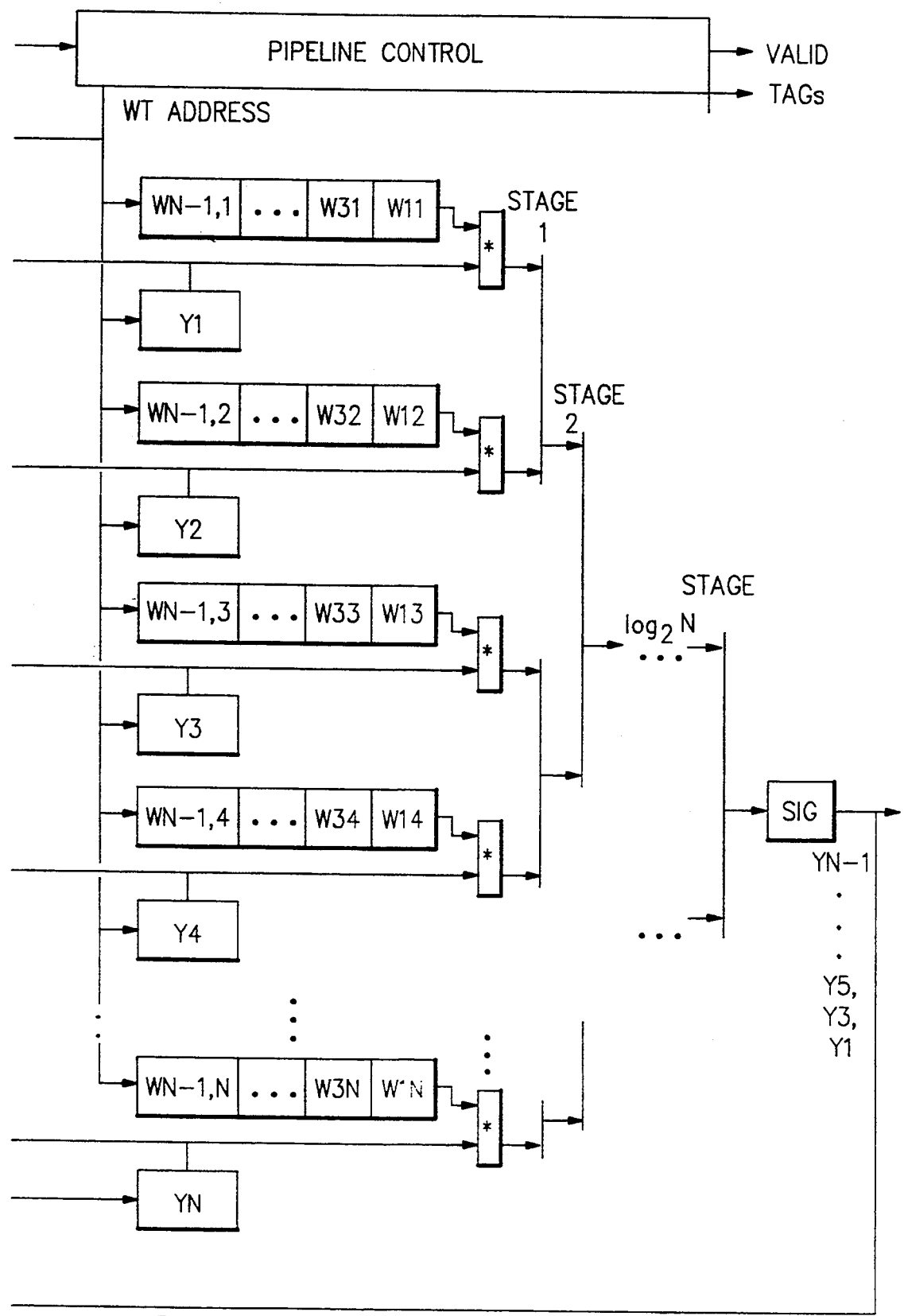

FIG. 9, made up of FIG. 9A and FIG. 9B, shows a Sequential Pipelined Neurocomputer-2: SPINN-2.

Figure 10A:
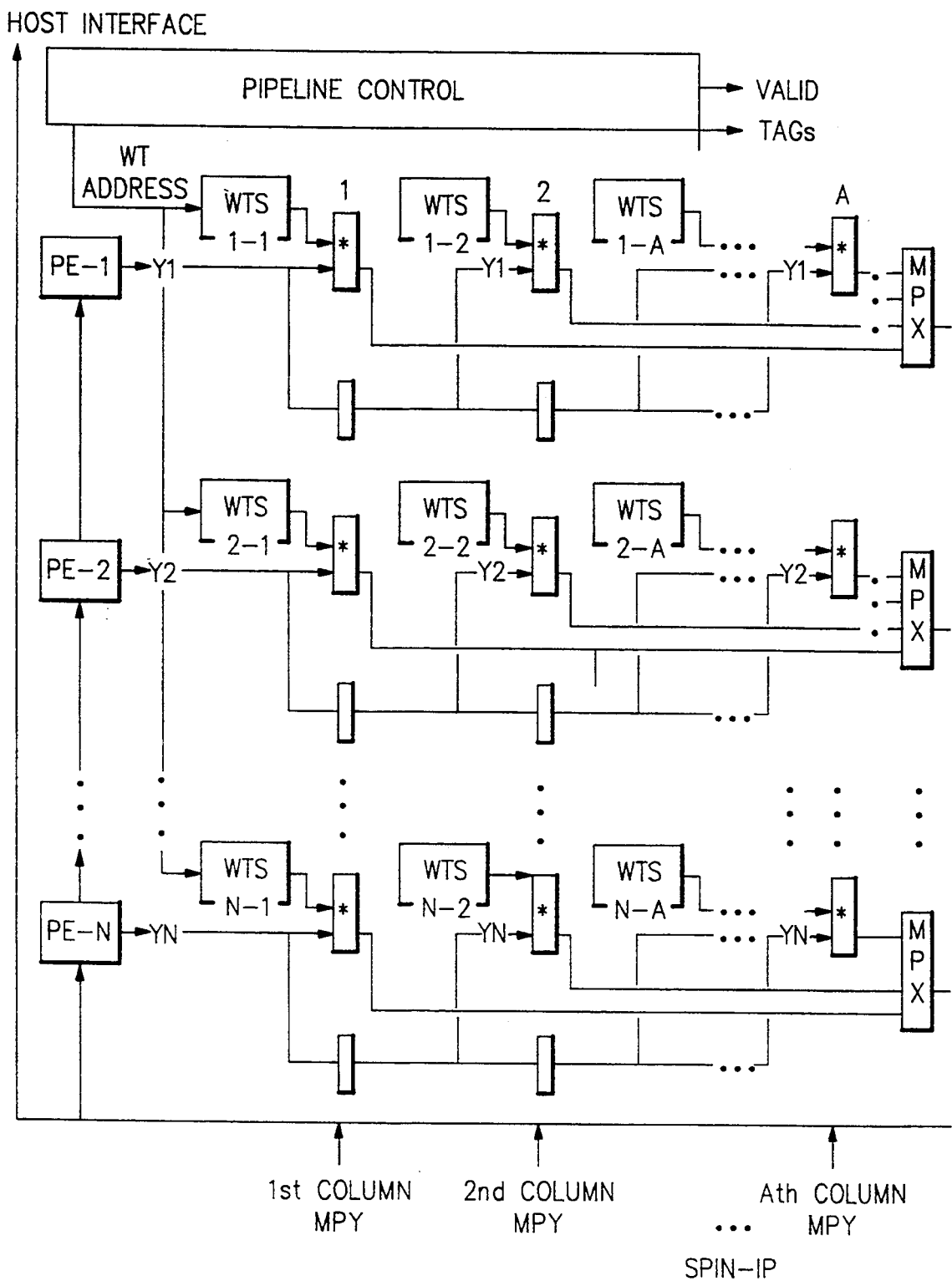

FIG. 10, made up of FIG. 10A and FIG. 10B, shows SPIN-IP.

Figure 11:
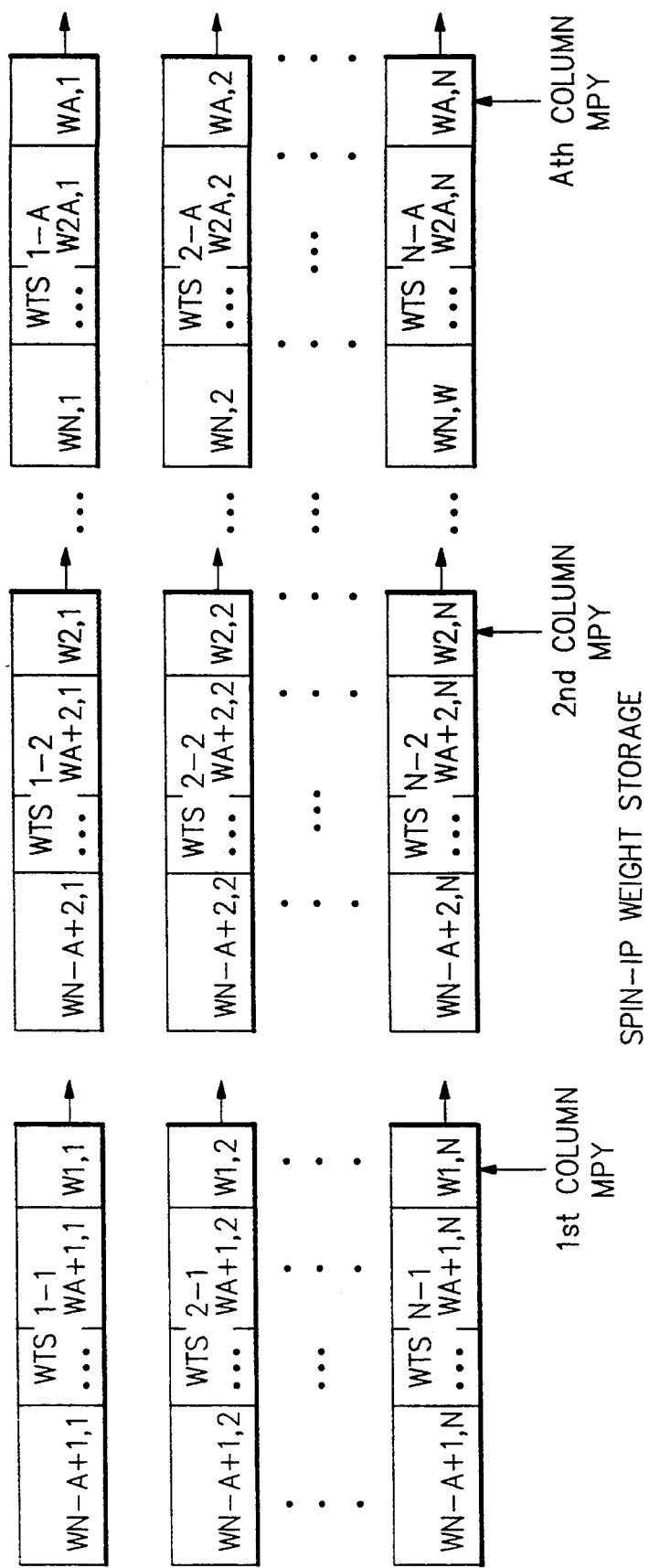

FIG. 11 shows SPIN-IP weight storage.

Figure 12:
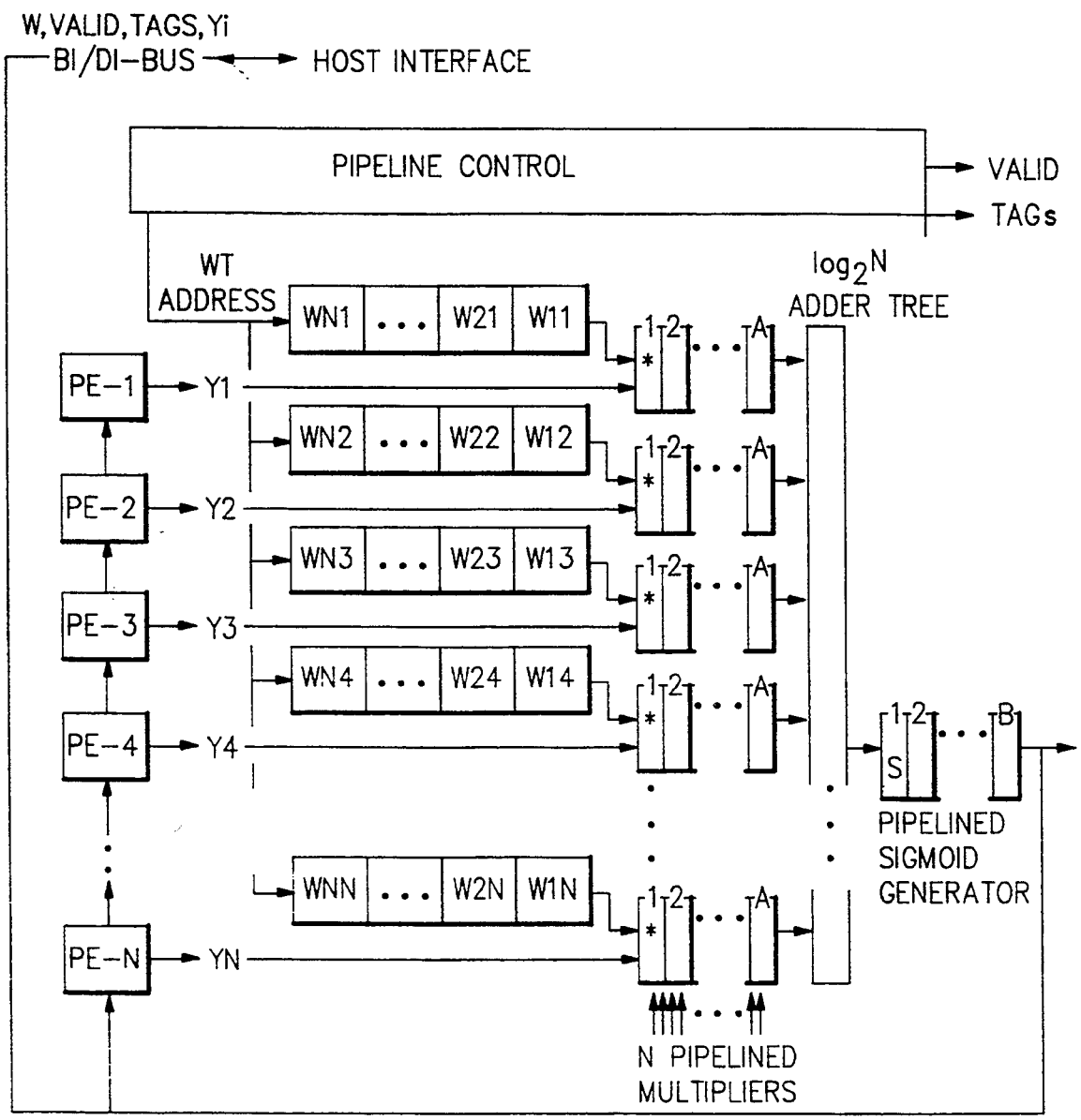

FIG. 12 shows SPIN-IP2.

Figure 13:
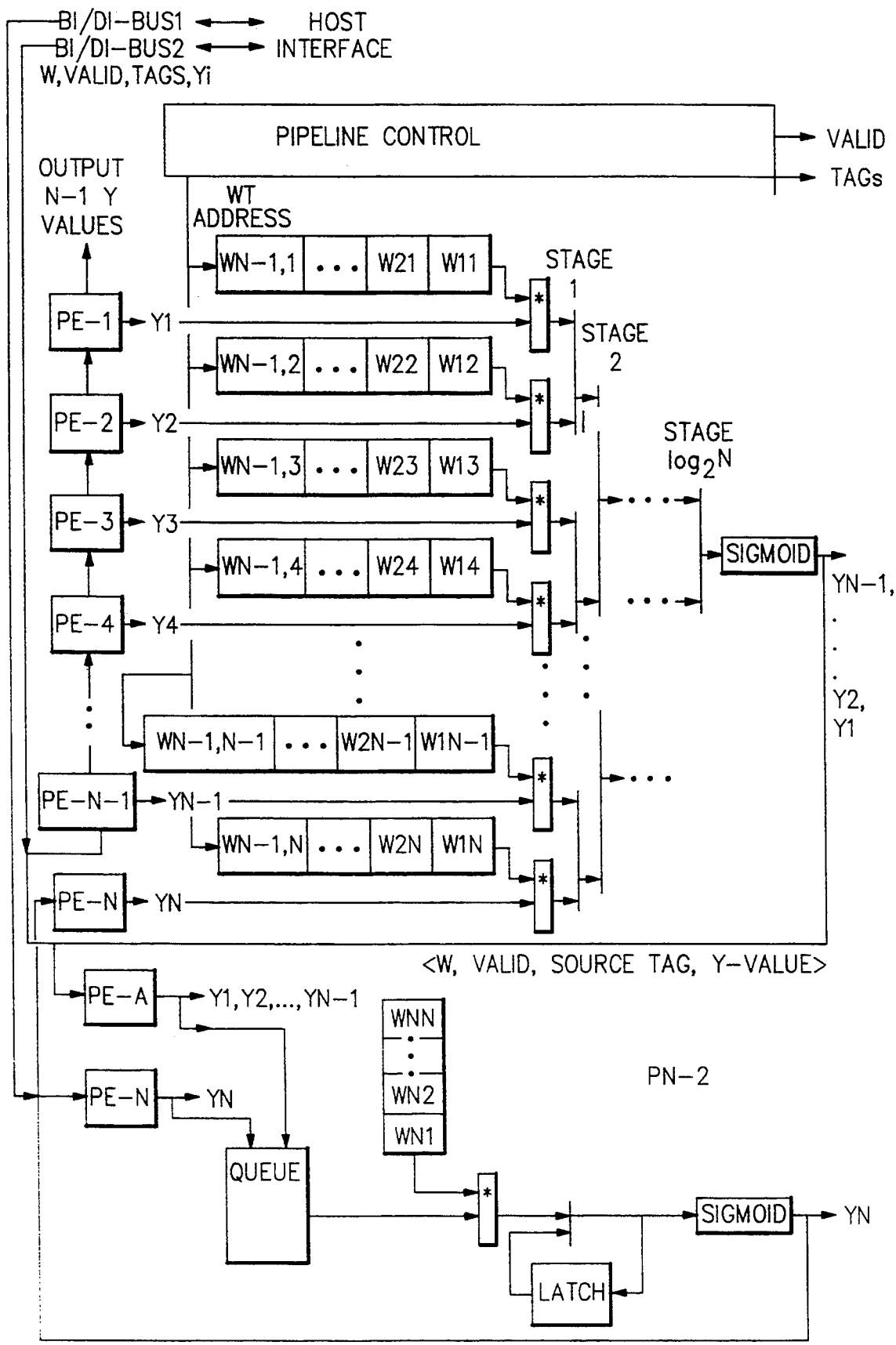

FIG. 13 shows SPIN-211.

Figure 14:
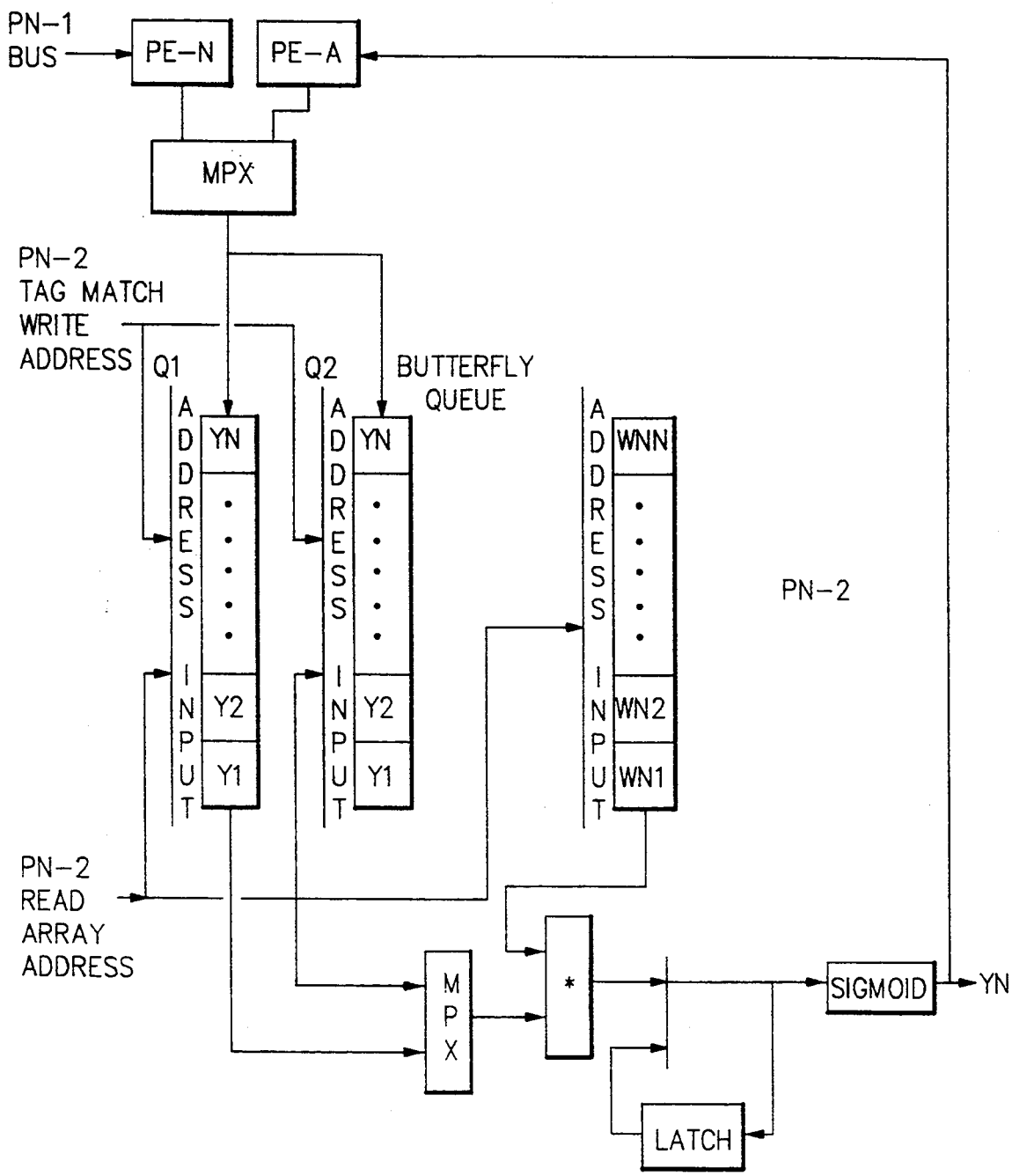

FIG. 14 shows SPIN-211 and the PN-2 queue based structure.

Figure 15B:
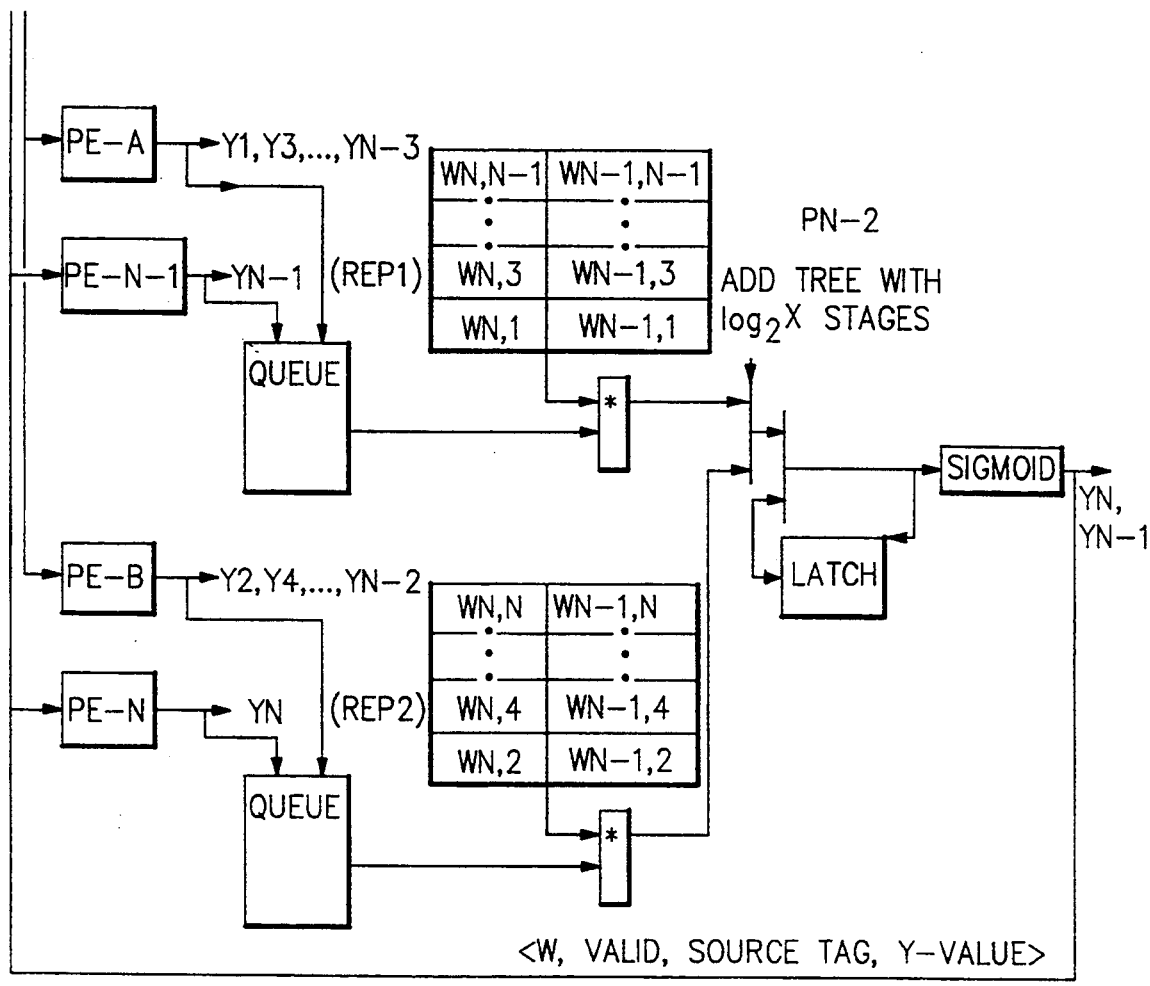
Figure 15:
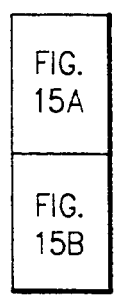

FIG. 15, made up of FIG. 15A and FIG. 15B, shows SPIN-EXP.

Figure 16:
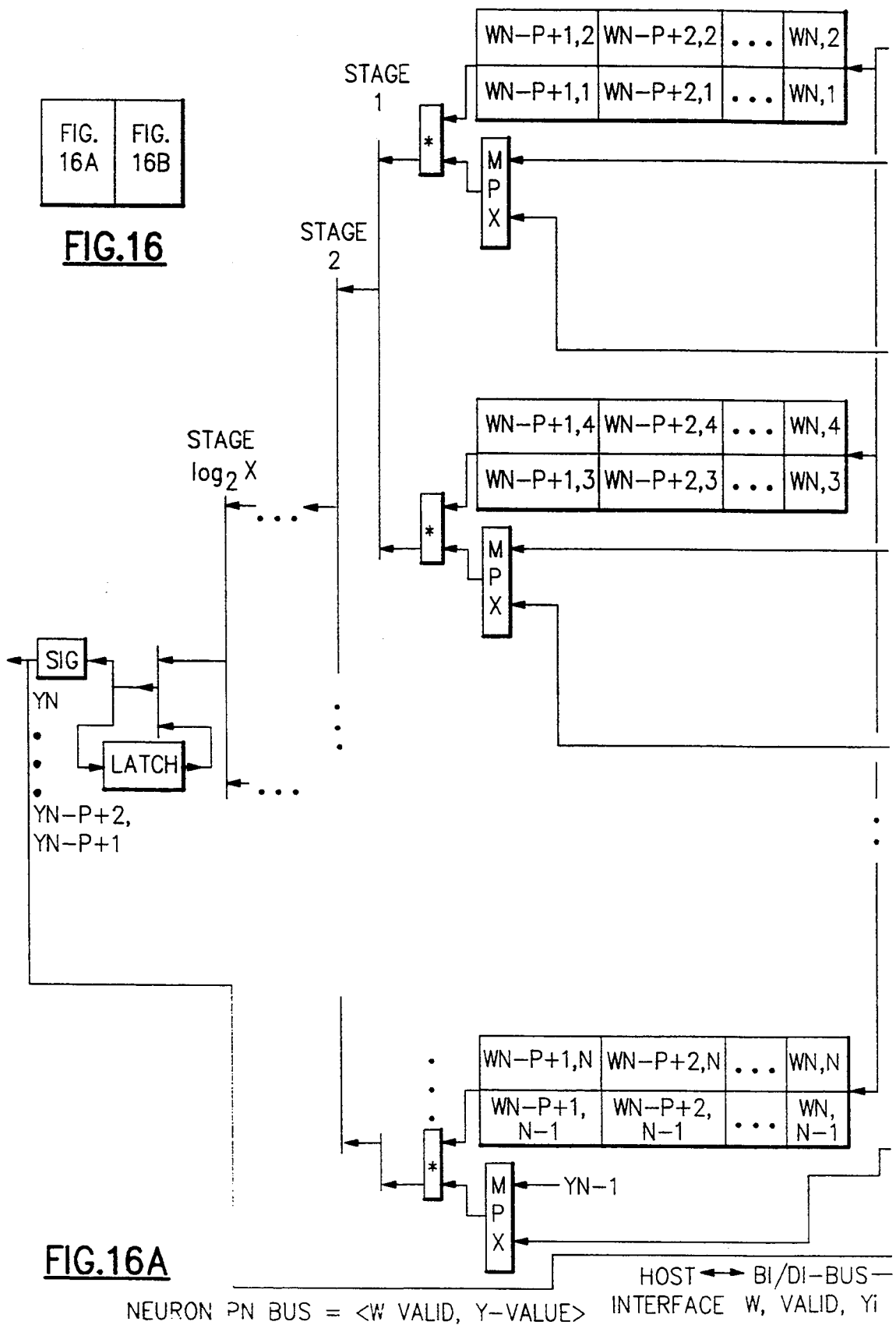

FIG. 16, made up of FIG. 16A and FIG. 16B, shows SPIN-2EXP with E=2 and with N/X to 1 multiplexors to provide PN-2's multipliers' inputs.

Figure 17:
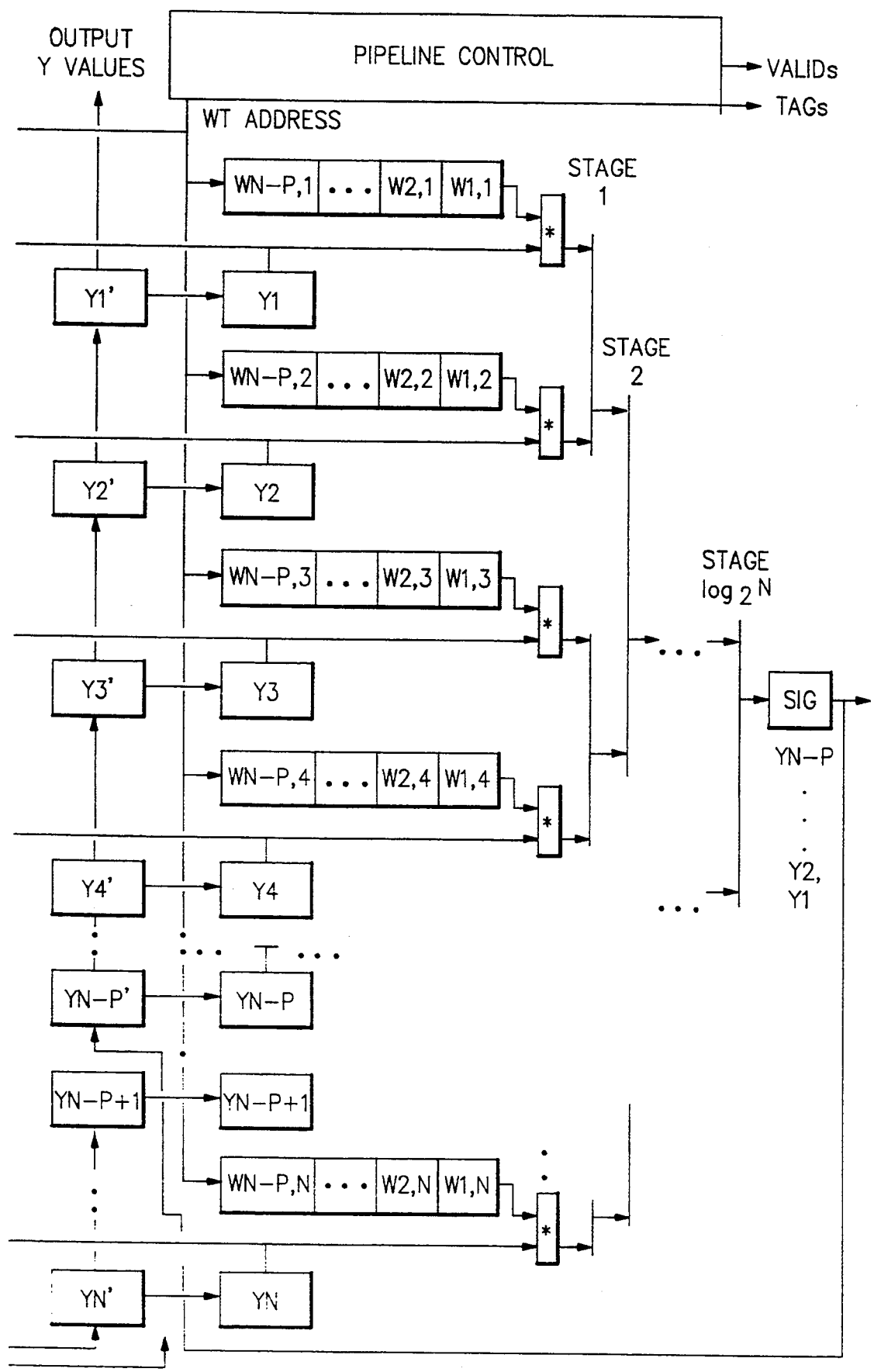

FIG. 17 shows an architecture comparison summary; while,

TABLE 1 illustrates Ring Systolic Array NN, SPIN, SPIN-EXP, SPIN-IP, AND SPIN-E respective performance comparisons.

DETAILED DESCRIPTION OF THE INVENTIONS

Ring Systolic Array Neural Network Description of Prior Art

As an example, the use of a systolic array for implementing equations 1 and 2 is described. The basic structure termed the ring systolic array as described in Kung 1989. is shown in FIG. 1. In this structure each PE is treated as a neuron, labeled $Y_i$, and contains the weight storage for that neuron with the weights stored in a circular shifted order which will correspond to the $j^{th}$ neuron values as they are linearly shifted from PE to PE. Assuming the initial neuron values and weights have been preloaded into the PEs, the architecture's operation sequence for a network update cycle will be as shown in FIG. 1. In this fashion a neural network can be modeled on a systolic array.

Ring Systolic Array Performance

To evaluate the performance of the ring systolic array architecture assume that the delay variables are denoted by $\delta_{name}$ which represents the delay through the "named" element. The following delay variables are used:

$\delta_M = Y_i W_{ij}$ multiplier delay.
$\delta_{Mb}$ = Bit-Serial single bit multiplier delay.
$\delta_A$ = 2 to 1 Adder delay.
$\delta_S$ = Sigmoid generator delay.
$\delta_{B1}$ = Ring Systolic Array NN Bus delay.
$\delta_W$ = Weight array access delay.

The following general assumptions and other notation will be noted:

1. The system defined clock period is C, with all delays specified as multiples of C.
2. $\delta_W \leq \delta_M$ The time to access a weight from the weight array must be less than or equal to the weight times Y value multiplier delay.
3. $\delta_{B1} \leq \delta_M$ or $\delta_{B1} \leq \delta_{Mb}$ in a bit-serial design. The bus delay must be less than or equal to the multiplier delay or bit multiplier delay in a bit-serial design.
4. $\delta_A \leq \delta_M$ or $\delta_A \leq \delta_{Mb}$ in a bit-serial design. The adder delay must be less than or equal to the multiplier delay or bit multiplier delay in a bit-serial design.

The performance of the architecture will be represented by the period of generating the neuron outputs. The ring systolic array architecture, FIG. 1 representing PRIOR ART, has the following performance characteristics assuming overlapped operations:

$$\text{SYSTOLIC RING period} = N\delta_M + \delta_A + \delta_{B1} + \delta_S \quad (3)$$

-Spin: Spin Description

A network of neural elements each implementing equations 1 and 2 is the basis of the neural architecture to be described. Equation 1 implies that all $Y_j$'s from $j=1$ to N are involved in the multiply accumulate function, indicating that each neuron is potentially connected to every other neuron in the network. The special case of a set of $W_{ij}$ being equal to zero will not be considered as representative of the general case to be covered by the model. Consequently a major consideration for the implementation of equation 1 typically has been the design of a network interconnection strategy which provides for complete connectivity of N Physical Neurons (PNs). The options considered, for example, range from a completely connected network of $N^2$ by bus-width wires to message passing structures containing routing processing elements such as hypercubes, hypernets, etc.. Since the completely connected network incurs no routing delays it has the greatest performance potential, assuming the $N^2$ by bus-width connections can be wired. As the number of PNs increase, the completely connected wiring problem becomes extremely costly and may be unrealizable resulting in choosing an interconnection method which solves the wiring problem via some type of network routing structure but at a cost of longer point to point delays. SPIN as well as the ring systolic array NN offer another alternative to this interconnectivity problem.

SPIN uses an alternative interpretation of equation 1 which is based on noting that for each neuron i there is a set of N weight multiplications with the same $Y_j$ input. This can be easily seen by expanding equation 1 and comparing the equations for multiple neuron outputs. For example the N neuron outputs as formed from equation 1:

$$Y_1 = F(W_{11}Y_1 + W_{12}Y_2 + \ldots + W_{1N}Y_N)$$

-continued
$$Y_2 = F(W_{21}Y_1 + W_{22}Y_2 + \ldots + W_{2N}Y_N)$$
.
.
.
$$Y_N = F(W_{N1}Y_1 + W_{N2}Y_2 + \ldots + W_{NN}Y_N)$$

Assuming the $Y_j$ inputs and their associated weights are separately available and there are N separate parallel multipliers, then for a given "i", N products can be formed in parallel in one multiplier delay time, $\delta_M$. These N products can then be added together forming a final summation z which is passed to the F(z) unit to produce a neuron output. By using a new "i" for the weight selection and keeping the $Y_j$'s fixed, the parallel products for the $i^{th}$ calculation can be obtained, again in one $\delta_M$ time period. This implies that a single neuron structure can be designed which, having separate parallel input weight processing coupled with a single fixed summation and F(z) function, can sequentially compute the N $Y_i$ neuron outputs. The F(z) function may be a nonlinear function of the type referred to as a sigmoid function. Other examples of neuron activation functions include threshold functions, probabilistic functions, and so forth.

Figure 2:
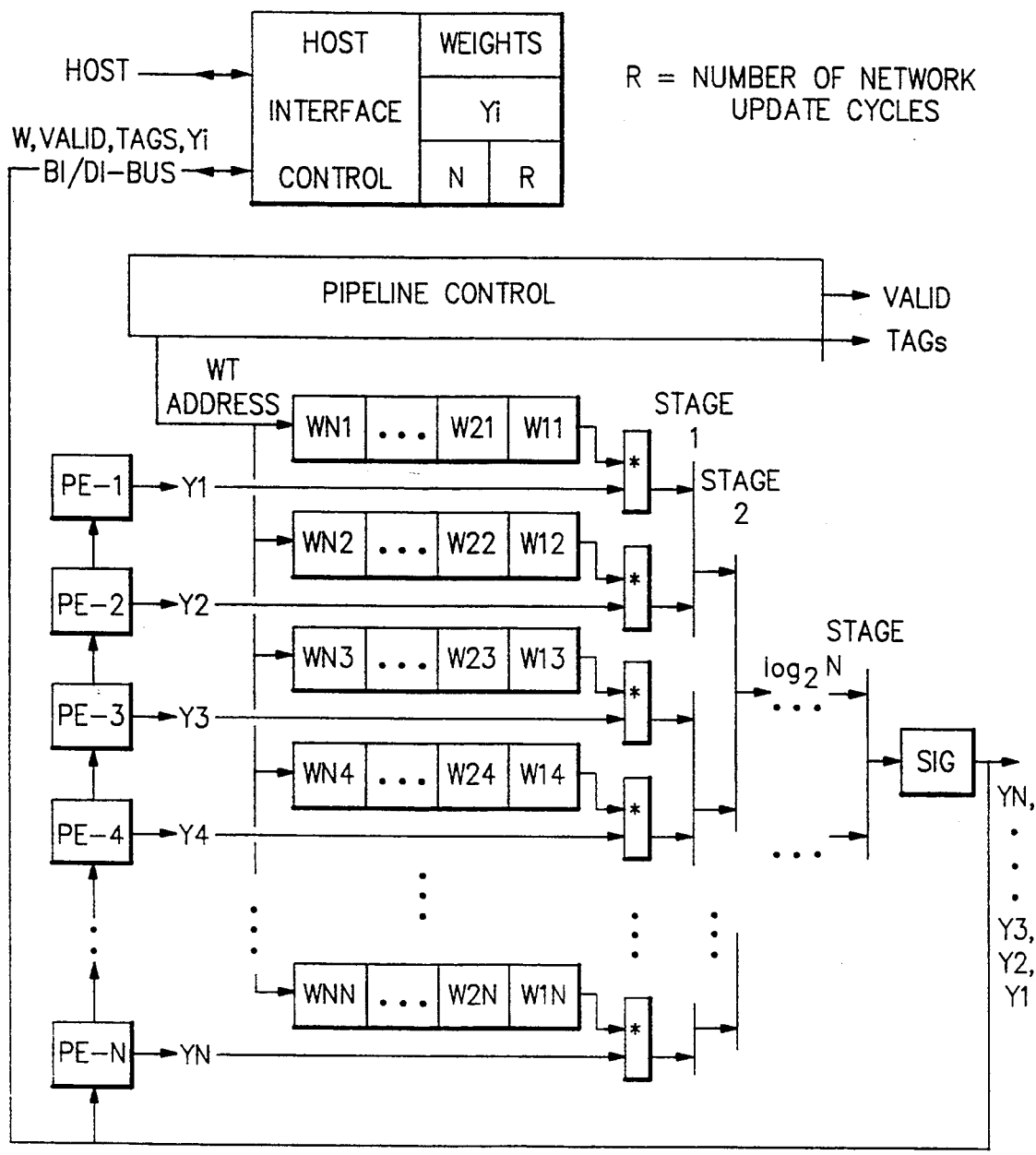
FIG. 2 shows the preferred embodiment of SPIN—the sequential pipelined neurocomputer.
Figure 3:
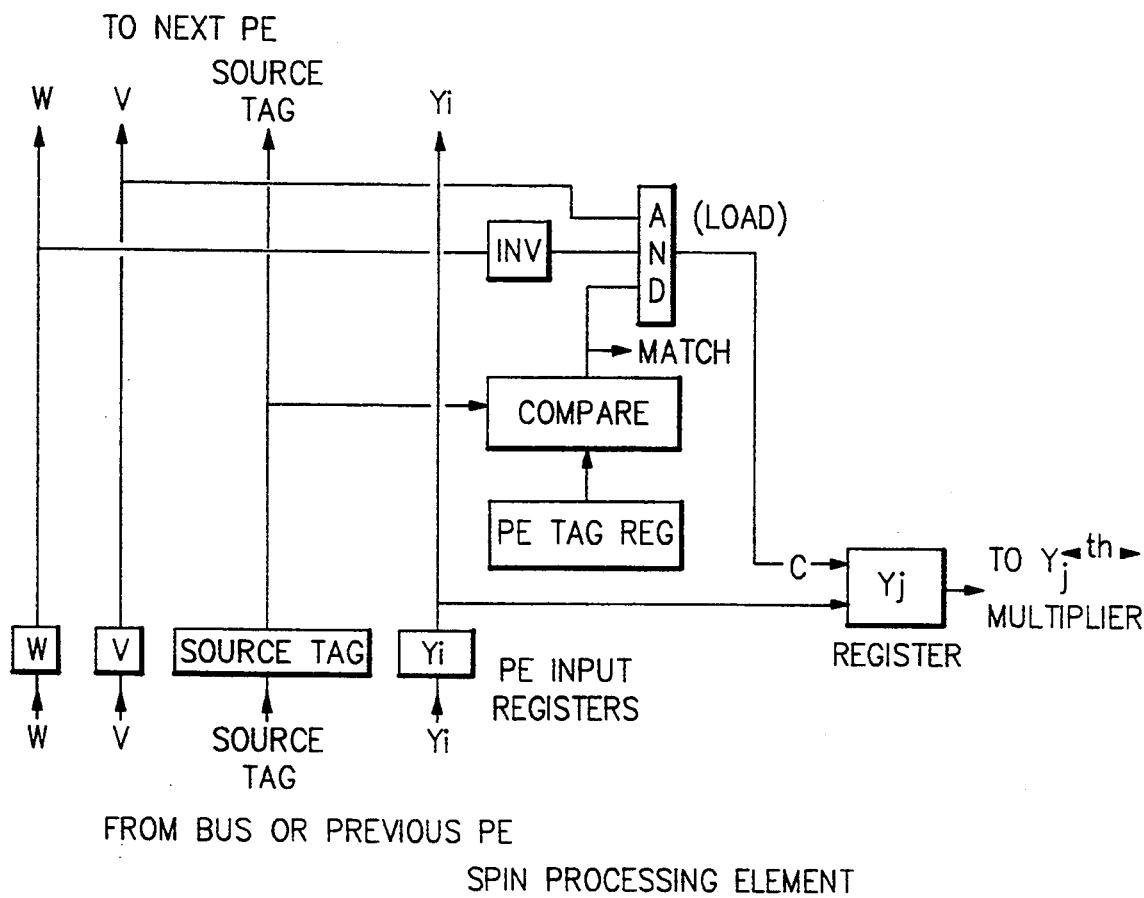
FIG. 3 shows a SPIN processing element.

SPIN, in which there is only one physical neuron (PN), is shown in FIG. 2. SPIN contains N input Processing Elements (PEs) providing the tag matching function, N weight multipliers, N weight storage units with N weights each, a symmetrical adder tree containing $\log_2 N$ 2 to 1 adder stages, a single sigmoid generator, and one bus of the desired bus width with one load. In SPIN the front end PEs provide the function of ensuring the tagged neuron value reaches its matching tagged multiplier. The Bus contains a packet of neuron information made up of a neuron value, its source tag, a VALID signal, and a HOST only controlled Weight bit. For N neurons there are N tags, N PEs, and N multipliers, but only one summation tree and one sigmoid generator. FIG. 3 depicts a typical PE.

The sequential production of the neuron values on a single neuron output bus requires that the $Y_i$'s be identified. This can be accomplished by ensuring a fixed sequential ordering of the neuron values, for example $Y_1$ then $Y_2$ second, ... and finishing with $Y_N$. In order to simulate neural networks containing (m) neurons on a SPIN designed for N physical neurons, where (m) is different than N, a tag identification method will be used where a tag equal to "i" identifies uniquely each neuron value. Each $Y_i$ value must be directed to a fixed multiplier input which requires a tag matching operation in the multiplier input, FIG. 3. The $Y_i$ and its "i" tag are connected from the sigmoid output to the last PE, PE-N, in the structure. Each neuron value received is shifted to the next PE. With this point to point shift register structure the order of neuron values is important and the neuron values should appear on the bus in a sequential order to match the weights stored in the weight arrays, for example as shown in FIG. 2; $Y_1$ first, $Y_2$ second, ..., $Y_N$ last. In order to ensure only valid stable data is received and processed, a tag bit, called Valid (V), can be placed on the bus with the neuron value and its "i" tag for one system clock period. The input receiving logic will not accept a $Y_i$ value unless the valid bit is "on" and there is an "i" tag which matches a prestored input tag. Even though the $Y_i$ values are sequentially arriving on the neuron inputs, a method of indicating the last neuron value has arrived must be provided to indicate when the N parallel multiplications can be started. Notification of the last neuron value to be received can be accomplished automatically by guaranteeing the sequential output ordering of neuron values. Since the neuron values are computed in order, for example starting from $Y_1$ and the bus is connected to PE-N, no match can occur until all $Y_i$ values have been received, i.e. when $Y_N$ is received at PE-N all preceding $Y_i$'s will be received (shifted) into the PE-i which contains the matching "i" tag. When the tag match occurs, each PE will transfer the received Y value to the multiplier input latch starting the parallel multiplication process for a new update cycle. This Nth event can also be indicated by serially shifting the Valid V bit through the N input registers. Assuming the V bit shift register latches are initially zero, and zeroed after each matching condition, the V bit will not reach PE-1, FIG. 2, until all N $Y_i$'s have been received. The use of the tag match method for receiving neuron values, allows for PE local transfer control of the matching $Y_i$ values and inherently allows for simulation of networks containing (m) neurons where $m \leq N$. Alternatively with all bits of the Y value received in parallel from the Neuron PN Bus and m=N, the V bit output of PE-1 can indicate that the next network update cycle should "START". In the case of a m<N network model, SPIN would be initialized with the $m^2$ weights, the (m) HOST loaded tags, and initial network Y values placed in the bottom (m) neuron input locations labeled N-m+1 through N with the other Y value locations being initialized to zero. The zero'd Y values ensures the N-m multipliers and their portion of the adder tree do not affect the simulation of the (m) neuron network on SPIN. SPIN sequentially produces the (m) values, (N-m+1), (N-m+2), . . . $N^{th}$, which on the last $m^{th}$ value, (m) tag matching conditions would occur causing the local transfer of the (m) values and the N-m zero Y values into the multiplier input registers beginning the next network update cycle. In addition, the shift register organized Y value input registers are zero'd out in preparation to receive the next (m) update cycle Y values. A counter would provide the Nth match signal if required in the control logic.

Figure 4:
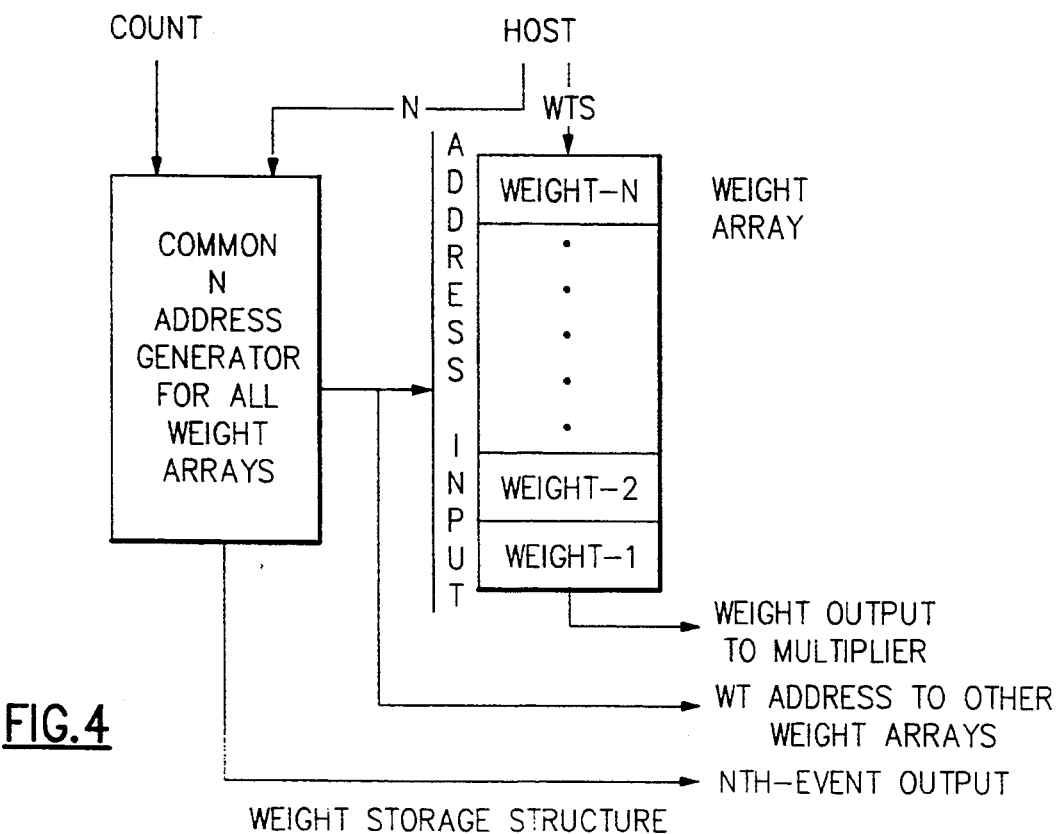
FIG. 4 shows a weight storage structure.

An example weight storage structure is shown in FIG. 4, which depicts an array whose weight output goes to a multiplier element in the model. The precision of the weight values and the number of weights determines the size of the array. For example, a weight value could be represented by an L bit number and for a completely connected N neural network SPIN implementation, the total weight storage would take $N^2$ weight values. Each SPIN neuron input would only be required to store N weights representing the input connectivities to each neuron, thereby requiring a N by L bit array in each neuron input. At initialization time the array's address generator is set to the $\emptyset^{th}$ weight address, representing the first weight value to be output to the multiplier. The address is advanced, up or down, in a manner that allows the next weight required be made available at the multiplier input in preparation for the next multiplication. The address generator would continue to advance until all of the network weights had been accessed. The address generator can also provide the duplicate function of counting the number of products required of the network model. The number of neurons (m) in the network to be modeled on SPIN, for the case of $m \leq N$, is loaded from the HOST computer and can be used by the address generator to produce a signal marking the $m^{th}$ event. The counter is assumed circular in that after generating the $m^{th}$ address it will return to its $\emptyset^{th}$ value.

For the HOST initialization and the logical pipeline control discussions assume m=N.

At HOST initialization time the PE TAGS, a different tag per PE, $N^2$ weights, the initial $Y_j$ neuron values, the number of neurons N, and the number of network iteration update cycles R will be loaded into the PN through its own HOST interface. With the exception of the PE TAGS which are scanned in, the loading of the weights and neuron values can utilize the NEURON PN BUS. A W tag bit controlled only from the HOST will enable the loading of the weights through the PEs. The $Y_i$ values are loaded last, for example, beginning with $Y_1$ and continuing in ascending order until $Y_N$ is loaded. With the receipt of $Y_N$ all Y values will enter the PE with a matching tag which will begin the network execution.

Figure 5:
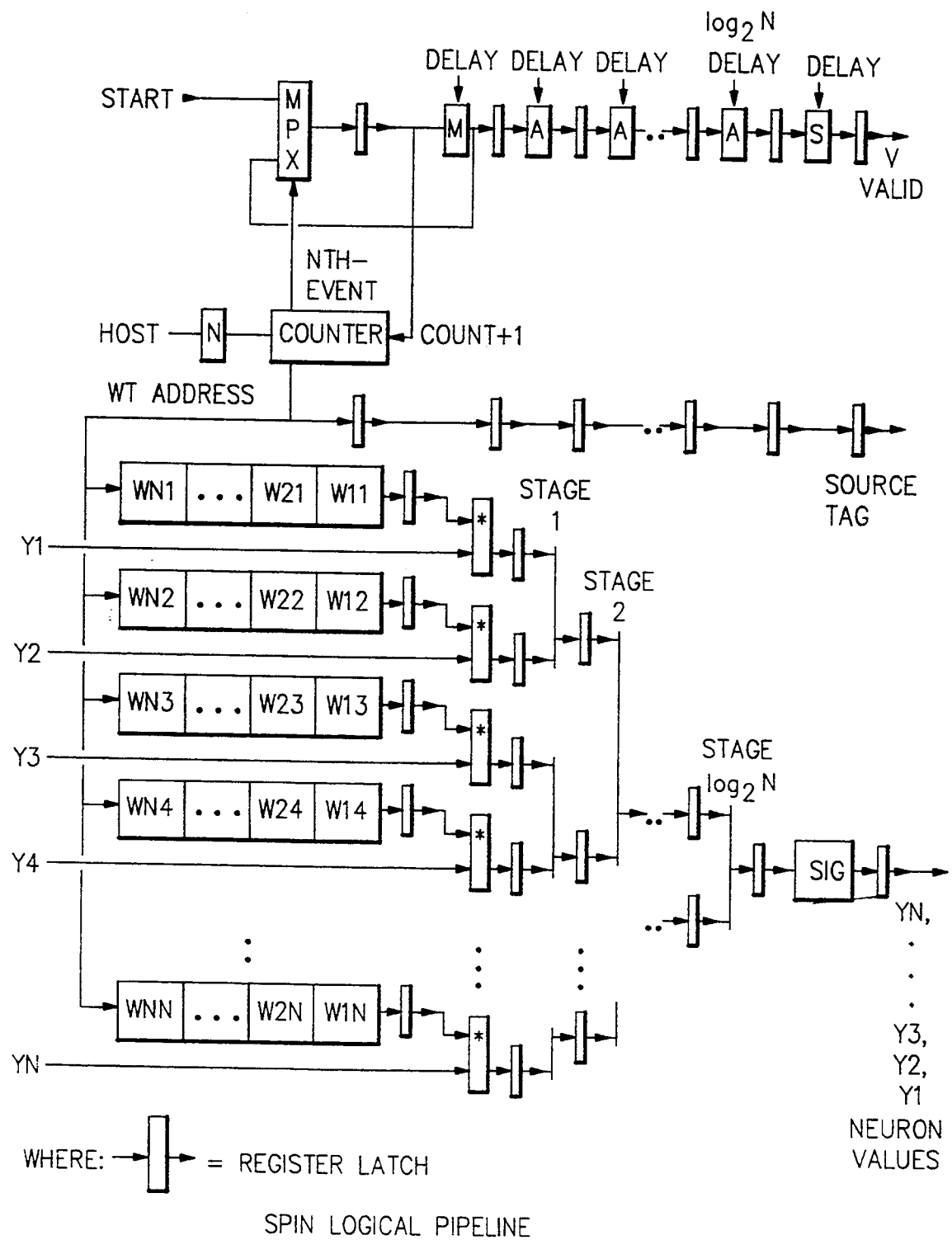
FIG. 5 shows a SPIN logical pipeline.

With the starting of network execution, the HOST will disable its use of the NEURON PN BUS and the PE will internally transfer the Y values to the multiplier input latches which, along with the applied $W_{ij}$ weight for $Y_j$, continues valid multiplications. During execution, the PN will sequentially output the neuron values, each represented by the bus packet of $<W, V, \text{Source Tag}, Y_i>$. For every neuron value there is a VALID bit active. If there is a VALID bit on and a MATCH condition between the prestored TAG and the TAG value on the bus, then the neuron Y value will be gated through and latched in the multiplier input stage. The matching condition will not occur until the $N^{th}$ packet is received. The PN pipeline with multiplier and the $\log_2 N$ adder tree is shown in FIG. 5. The multipliers receive the Y values from the PE compare and gating function while weights are available from weight storage. The $Y_j$ input remains as a constant input throughout the network updating cycle with just the weight storage reading out new weights as in a push down stack pairing $W_{ij}$ with $Y_j$ as i varies sequentially. The N match conditions, occurring on the receipt of the $N^{th}$ Y value, causes a START signal which begins the next network update cycle. For example in FIG. 5, the front end of the Valid logic uses a circular shift register as indicated by the MPX, Latch, and Delay $\delta_M(M)$ blocks. This circular shift register shifts a Valid bit such that a new Valid bit begins at the start of the each multiply operation. The Valid bit also sequences down a pipeline which is the duplicate of the PN Multiply and adder tree pipeline except that the function blocks of multiply, add, and sigmoid generate are simulated by delay blocks. The Valid pipeline can control the other pipelines by having the Valid bit, as it shifts through the pipeline, control the other pipeline latches at the same pipeline level as the Valid bit. The Valid pipeline delay blocks may have to be one clock cycle less than the specified block delay to allow this type of control to be achieved, depending upon implementation specifics. The Weight arrays are addressed from a counter which is logically advanced by the Valid bit prior to entering the multiplier delay block so that the address of the next weight will be prepared in advance. The counter will count to a maximum of N events equal to the number of neurons to be processed in the network after which it will create the NTH-EVENT signal which ensures no N+1 Valid bit is created. The counter addresses the $i^{th}$ weight in each weight array. This $i^{th}$ address also represents the TAG for the $Y_i$ calculation. The source tag "i"

is then pipelined so that it arrives onto the bus in synchronism with the neuron $Y_i$ value. For this discussion the multipliers are not pipelined, though this is not precluded by SPIN, but the multiplies do overlap the adding operation. This requires the placement of a register latch between the multiplier and the adder tree. The adder tree is pipelined between stages allowing a new summation process to start prior to the previous summation finishing through the adder tree. Additionally, each adder stage is latched though this is not depicted in the figures for clarity reasons. After $\log_2 N$ add stages are completed, the accumulated sum across all "j"s 1 to N of $Y_j W_{ij}$ for a given "i" is clocked into the sigmoid input latch. After the sigmoid generator completes, the results are placed onto the single BUS.

Figure 6:
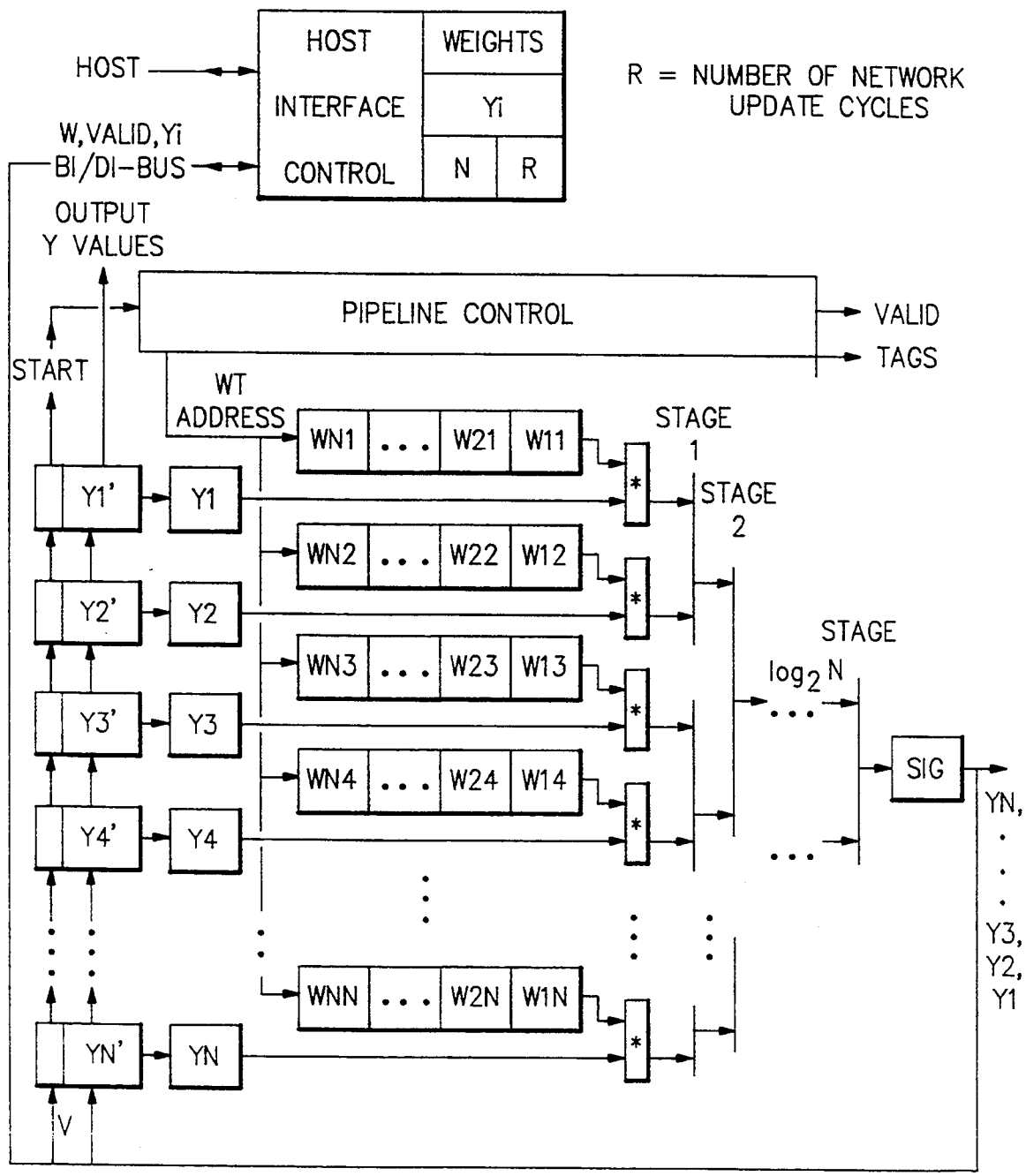
FIG. 6 shows a simplified—SPIN with no tag match PE function.

As mentioned, the tagged SPIN architecture described can be simplified, for the case m=N, by the removal of the tag compare function from each PE. The structure simplifies to that depicted in FIG. 6.

- SPIN PERIOD CALCULATION:

To evaluate the performance of the previously described architecture, SPIN, assume that the delay variables are denoted by $\delta_{name}$ which represents the delay through the "named" element. For SPIN the following delay variables are used:

$\delta_{PE}$=SPIN PE delay.
$\delta_M = Y_i W_{ij}$ multiplier delay.
$\delta_A$=2 to 1 Adder delay.
$\delta_S$=Sigmoid generator delay.
$\delta_{B2}$=SPIN Bus delay.
$\delta_W$=Weight array access delay.

The following general assumptions and other notation will be noted:

1. The block delays are denoted by a "d" subscript.
2. The system defined clock period is C, with all delays specified as multiples of C.
3. The adder tree in SPIN is pipelined between stages.
4. In SPIN the number of stages in the adder tree is $\log_2 N$, where N is the total number of neurons to be simulated and equal to the number of SPIN inputs.

The performance of the SPIN architecture will be represented by the period of generating the neuron outputs. Since SPIN, as with the ring systolic array, is based on the recursive equation 1, the computation of $Y_{i+1}$ cannot begin before the previous $Y_i$ values have been calculated and received at the input logic. For these period calculations the multiply and sigmoid functions are not considered pipelined functions, though this is not precluded by SPIN, but will require their inputs to be held constant for the whole multiplier or sigmoid delay. For the safeness of the structure and performance reasons, it is desired that the values for a computation are present in the inputs of the various functional units when required and that the input logic and weight access operate in parallel with the multiply operations. In order to achieve safeness with no additional delays, a number of constraints must be met by the architecture. For there to be no delay gaps between the multiplier operations, the weight access and input PE delay must be less than or equal to the multiplier delay:

$$\delta_W \leq \delta_M \quad (4)$$

$$\delta_{PE} \leq \delta_M \quad (5)$$

If equation 4 and 5 cannot be met then the unit with the maximum delay time $\delta_W$, or $\delta_{PE}$ controls the timing to ensures valid data can feed the multiplier as required with no hazards. In order for the result of a multiply to feed the adder tree with no conflicts, the multiply delay must be longer than the adder delay:

$$\delta_M \geq \delta_A \quad (6)$$

With these delay restrictions the final summation results for each $Y_i$ will be sequentially entering the sigmoid generator at a rate of one every multiplier delay, which is the rate that the $Y_j W_{ij}$ products enter the adder tree. Assuming the sigmoid function is not pipelined, another delay restriction is necessary in order to guarantee safeness:

$$\delta_S \leq \delta_M \quad (7)$$

This ensures the sigmoid function can receive each summation value for processing. If $\delta_S > \delta_M$ then buffering at the sigmoid input or the use of multiple sigmoid generators operating in parallel would be required. An example approach which meets the $\delta_S \leq \delta_M$ restriction with a single sigmoid generator uses a table look up approximation to the linear sigmoid function. This approximation technique has been used in other neurocomputers, for example in Treleaven 1990.

In summary the SPIN safeness restrictions are:

| | |
|---|---|
| $\delta_W \leq \delta_M$ | Equation 4 |
| $\delta_{PE} \leq \delta_M$ | Equation 5 |
| $\delta_M \geq \delta_A$ | Equation 6 |
| $\delta_S \leq \delta_M$ | Equation 7 |

Briefly, in SPIN the neuron values $Y_1, Y_2, \ldots, Y_N$ are sequentially output from the one PN. Each value is tagged and then placed on the bus. The appropriate PE that has matched the tag on the bus gates the neuron output value to the correct input multiplier. The matching condition can only occur when all N neuron values have been received. This sequential ordering and the connection of the bus to PE-N ensures the SPIN processor functions in each iteration cycle just as it did on initialization with the only exception being in how the neuron values were obtained, at initialization from the host computer and during execution internally processed. The delay for the N multiplications is:

$$(Y_1 W_{11})_d = \delta_M$$

$$(Y_2 W_{12})_d = \delta_M$$

$$\vdots$$

$$(Y_N W_{1N})_d = \delta_M$$

The delay of the first stage of addition is:

$$(Y_1 W_{11} + Y_2 W_{12})_d = \delta_M + \delta_A = L0_{1d}$$

$$(Y_3 W_{13} + Y_4 W_{14})_d = \delta_M + \delta_A = L0_{2d}$$

$$\vdots$$

$$(Y_{N-1} W_{1N-1} + Y_N W_{1N})_d = \delta_M + \delta_A = L0_{Nd}$$

The delay of the second stage of addition is:

$$LO_{1d} + LO_{2d} = \delta_M + 2\delta_A = L1_{1d}$$

$$LO_{3d} + LO_{4d} = \delta_M + 2\delta_A = L1_{2d}$$

$$\vdots$$

$$LO_{N-1d} + LO_{Nd} = \delta_M + 2\delta_A = L1_{Nd}$$

The final summation delay is:

$$\left( \sum_{j=1}^{N} Y_j W_{1j} \right)_d = \delta_M + (\log_2 N)\delta_A$$

The final summation must be operated upon by the sigmoid function and then be passed on the single bus to the PE inputs and then processed by the PE before reaching the multiplier inputs. This delay is:

$$(Y_1)_d = F\left( \sum_{j=1}^{N} Y_1 W_{1j} \right)_d =$$

$$\delta_M + (\log_2 N)\delta_A + \delta_S + \delta_{B2} + \delta_{PE}$$

Since the multiplier is not pipelined, each weight multiplication occurs sequentially. In addition, assuming $\delta_S \leq \delta_M$ or a pipelined sigmoid generator and the pipelined adder tree, the next neuron values produced are of the form:

$$(Y_i)_d = (i)\delta_M + (\log_2 N)\delta_A + \delta_S + \delta_{B2} + \delta_{PE}$$

For example the delay of the $9^{th}$ neuron value is:

$$(Y_9)_d = 9\delta_M + (\log_2 N)\delta_A + \delta_S + \delta_{B2} + \delta_{PE}$$

Each new network update cycle follows the same delays as the first cycle after initialization. The period associated with producing a neuron's value is:

SPIN
period $= (Y_N)_d = N\delta_M + (\log_2 N)\delta_A + \delta_S + \delta_{B2} + \delta_{PE}$ (8)

- PERFORMANCE DISCUSSION

In comparing the results of the two periods, systolic ring with SPIN

Systolic ring period $= N\delta_M + \delta_A + \delta_S + \delta_{B1}$   Equation 3

SPIN period $= N\delta_M + (\log_2 N)\delta_A + \delta_S + \delta_{B2} + \delta_{PE}$   Equation 8

Assuming $\delta_{B1} = \delta_{B2}$ and $\delta_{PE}$ small, it is noticed that the main difference in SPIN's performance is due to the adder tree, namely:

PERFORMANCE DIFFERENCE $\cong (\log_2 N)\delta_A$

This difference of $(\log_2 N)\delta_A$ becomes small as N increases. For large N, SPIN provides comparable performance with the ring systolic array.

- VSPIN: VIRTUAL SPIN DESCRIPTION

There are a number of ways that SPIN can be modified to handle the case where m>N, m=number of neurons in the neural network and N the number of physical neurons SPIN supports. An example modification to SPIN and its operation will be examined. Consider a SPIN with the addition of an accumulating adder located at the output of the $\log_2 N$ adder tree. This accumulating adder would contain (m) storage elements, Partial Sum Array, allowing the storage of (m) Partial Summation (PS) values. The sigmoid generator would not be engaged until the full input summation dictated by equation 1 is met. In addition, the weight storage would be expanded to allow for larger networks. The control structure would be modified as described in the following operation sequence. For a given size of weight memory, MEM weights, at each SPIN input and a given N, neural networks where m>N can be executed. The size of (m) is given by:

$$m = \sqrt{(N(MEM))}$$

Figure 7:
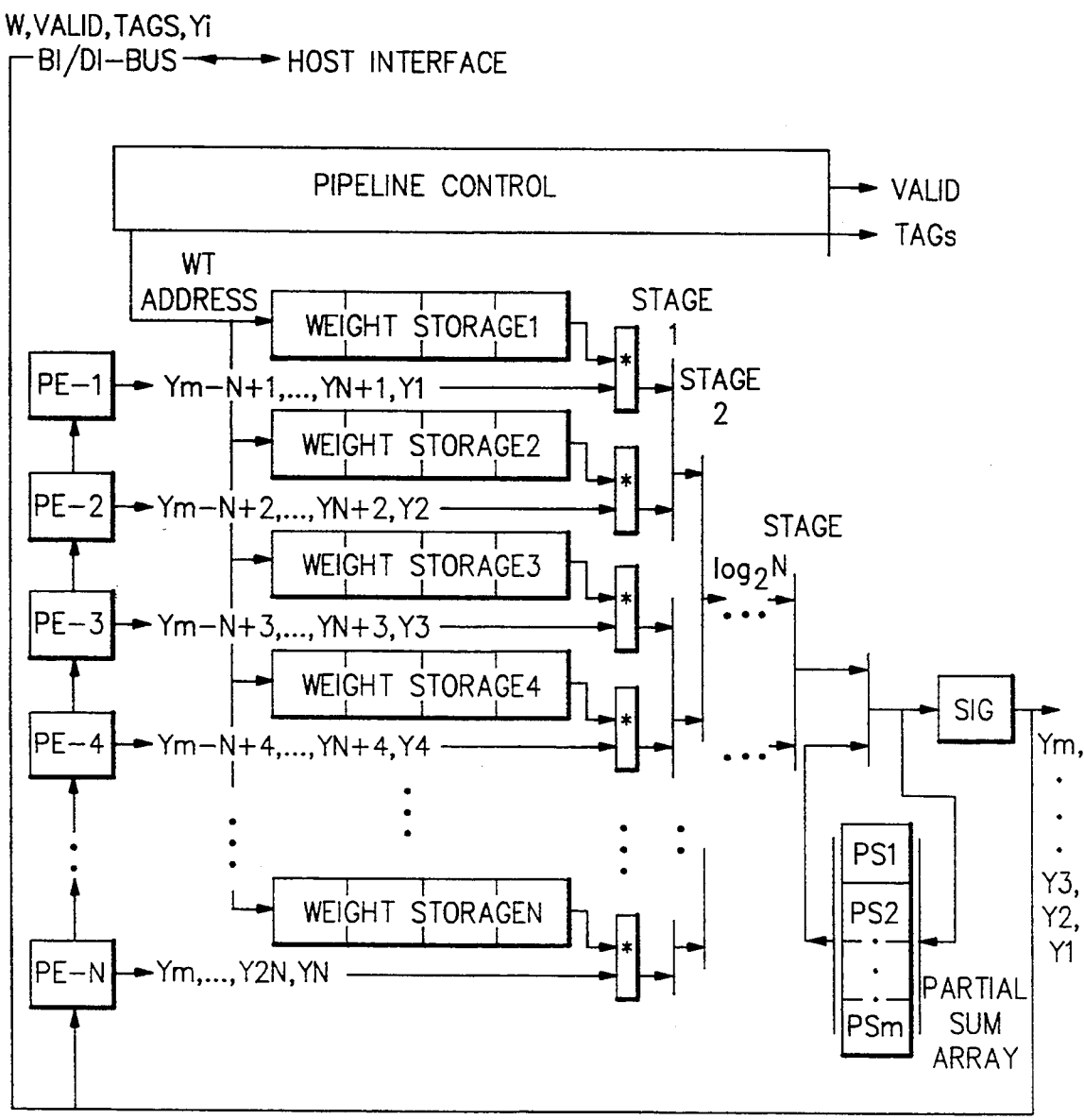
FIG. 7 shows a Virtual Sequential Pipelined Neurocomputer—VSPIN.
Figure 8:
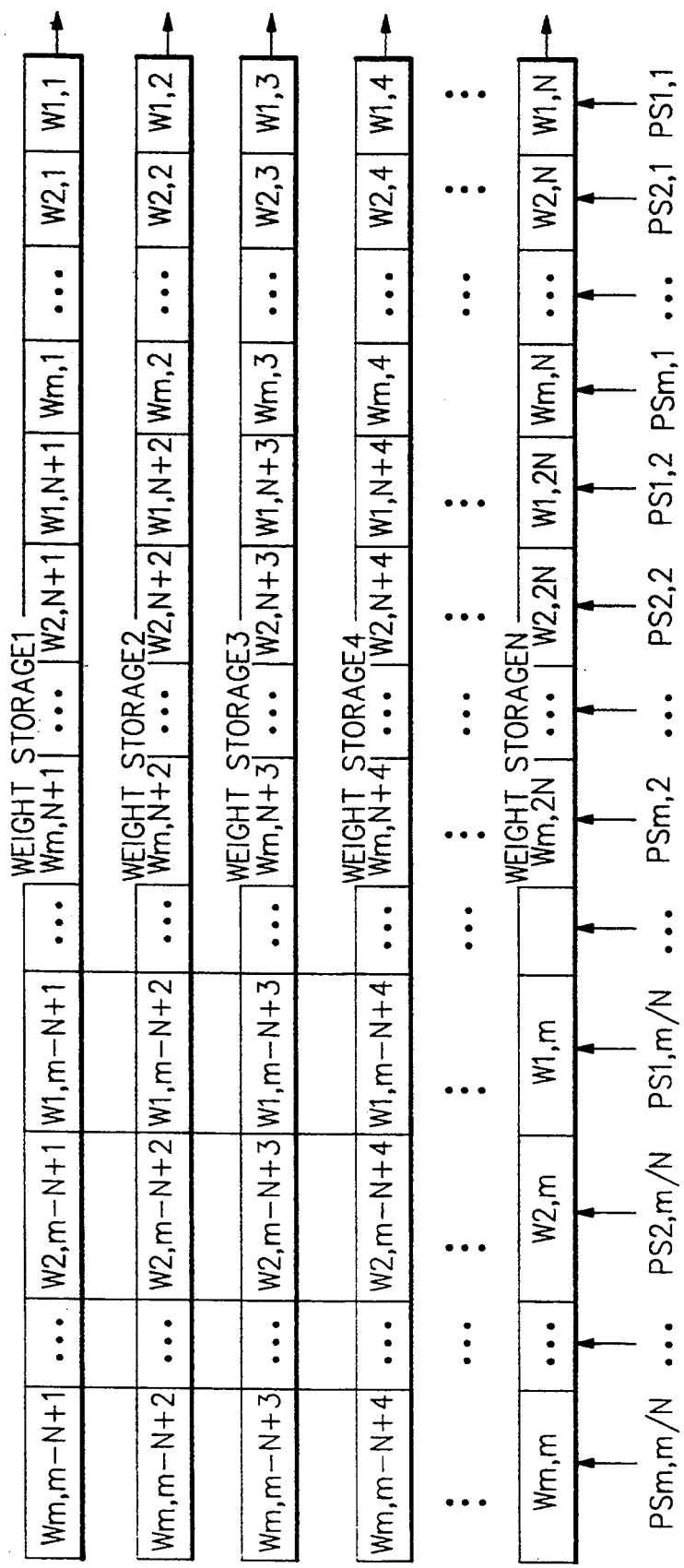
FIG. 8 shows a VSPIN weight storage.

This is because there are a possible $m^2$ weights in a completely connected (m) neuron network and the $m^2$ weights are divided among the N SPIN inputs. For simplicity, assume (m) is an integer number resulting from the square root. For example, assuming an L bit weight value, N=128, and an input weight array memory of MEM=32K weights of L bits each, then (m) would equal 2048 completely connected neurons which could be simulated on the SPIN structure containing 128 inputs. The VSPIN structure is depicted in FIG. 7, where the HOST interface functional block has been removed for clarity. The weights would be stored as shown in FIG. 8. VSPIN would operate as follows:

START: Transfer in Y values $Y_1, Y_2, \ldots Y_N$ to the multiplier input registers and start VSPIN execution.

Begin HOST loading of Y values $Y_{N+1}, Y_{N+2}, \ldots Y_{2N}$ and store Partial Summations ($PS\_, \_$) in Partial Sum Array.

1) $PS1,1 = \sum_{j=1}^{N} Y_j W_{1j}$

2) $PS2,1 = \sum_{j=1}^{N} Y_j W_{2j}$ $\vdots$ m) $PSm,1 = \sum_{j=1}^{N} Y_j W_{mj}$ Transfer in new Y values $Y_{N+1}, Y_{N+2}, \ldots Y_{2N}$ to the multiplier input registers and start VSPIN execution.

Begin HOST loading of Y values $Y_{2N+1}, Y_{2N+2}, \ldots Y_{3N}$ and store Partial Summations ($PS\_, \_$) in Partial Sum Array.

$m+1$) $PS1,2 = \sum_{j=N+1}^{2N} Y_j W_{1j}$ $m+2$) $PS2,2 = \sum_{j=N+1}^{2N} Y_j W_{2j}$ $\vdots$ $2m$) $PSm,2 = \sum_{j=N+1}^{2N} Y_j W_{mj}$ -continued Transfer in new Y values $Y_{m-N+1}, Y_{m-N+2}, \ldots Y_m$
to the multiplier input registers and start VSPIN execution.

$$(m*m/N) - m + 1) \, PS1, m/N = \sum_{j=m-N+1}^{m} Y_j W_{1j}$$

Send $PS1, m/N$ to sigmoid to generate $Y_1$

When the sigmoid function is complete send $Y_1$ to
PE-N and the HOST interface.

$$(m*m/N) - m + 2) \, PS2, m/N = \sum_{j=m-N+1}^{m} Y_j W_{2j}$$

Send $PS2, m/N$ to sigmoid to generate $Y_2$

When the sigmoid function is complete send $Y_2$ to
PE-N and the HOST interface.

.
.
.

When the sigmoid function is complete send $Y_N$ to
PE-N and the HOST interface.

The next $m - NY$ values will only go to the HOST
interface and the PEs will hold the NY values until
the network is "START"ed.

$$(m*m/N) - m + N + 1) \, PSN + 1, m/N = \sum_{j=m-N+1}^{m} Y_j W_{N+1,j}$$

Send $PSN + 1, m/N$ to sigmoid to generate $Y_{N+1}$

When the sigmoid function is complete send
$Y_{N+1}$ to the HOST interface.

.
.
.

$$m*m/N) \, PSm, m/N = \sum_{j=m-N+1}^{m} Y_j W_{mj}$$

Send $PSm, m/N$ to sigmoid to generate $Y_m$

When the sigmoid function is complete send
$Y_m$ to the HOST interface.

Repeat until the HOST specified number of update
cycles have been completed.

Alternatively, all the Y values could be sent to the HOST which, after receiving the (m) Y values, would initialize the PEs with $Y'_1, Y'_2, \ldots, Y'_N$ values and START the network but performance would degrade.

For the example where N=128 and MEM=32K×L bits, the VSPIN would directly implement a 128 neuron network at full performance and a 2048 neuron network in virtual mode. Following Hopfield's example for the Traveling Salesman Problem (TSP) mapped onto a neural network of Hopfield 1985, the VSPIN example just created would allow a 10 city problem to be directly executed and a 45 city problem to be executed in virtual mode.

This represents only one method of expansion for SPIN, others are possible utilizing HOST interface interaction for both weight and Y value updates.

- VSPIN PERIOD CALCULATION

While each group of (m) Partial Summations is occurring, the HOST interface is loading a new set of N Y values, required for the next group of (m) Partial Summations. If properly designed, the loading of the N Y values will take less time than the processing of the (m) Partial Summations. A buffer of (m) Y values in the HOST interface, for example, can accomplish this such that the HOST interface would not impact the VSPIN period calculation.

For m>N and under the same restrictions as SPIN it can be shown that the VSPIN period equation is:

$$VSPIN \ period = \frac{m^2}{N} \delta_M + (\log_2 N + 1)\delta_A + \delta_S + \delta_{B2} + \delta_{PE}$$

For m=N the VSPIN period is approximately the same as the SPIN period.

- SPIN-E: SPIN-E DESCRIPTION

Further improvements are possible with additional hardware in the SPIN architecture. For simplicity consider the untagged SPIN-E structure, FIG. 9 where E=2, which utilizes two of the original SPIN configurations merged together, with m=N and N being an even number of neurons. The single HOST interface is assumed to provide the same function as in SPIN. In addition it should be noted that logically only one weight address generator is needed even with multiple PNs, though the implementation might dictate otherwise.

Before proceeding though, a brief discussion of the more general tagged architecture is in order since it must be different than that used in SPIN. For example, with E PNs, the PNs identified by -K (PN-K) where K is equal to 1, 2, ..., E, i sequentially varying from i equal to 1, 2, ..., N/E, and N/E being an even integer then PN-K TAGS=$K+E(i-1)$ In this case, each unique PN's starting tag will be $+1$ greater than the previous PN's tag. This starting tag will become the $\emptyset^{th}$ tag for that particular PN. Each succeeding tag will just be a $+E$ count over the past tag and returning to its initial $\emptyset^{th}$ tag value after the last tag has been output on the bus. Consequently there would be a $+E$ counter tag circuit duplicated in each PN. The SPIN-2 structure has two buses each going to a neuron value synchronization unit, which receives two Y values in parallel and sequentially outputs the Y values, in correct order, to the serially connected neuron input Y value registers. Two shifts are required by the synchronization logic which can be easily done in the delay time between Y values such that the synchronization time is only seen on the last Y values. As compared to SPIN, SPIN-E uses E times as many multipliers, 2 to 1 adders, and sigmoid generators but the same number of Y value registers since they can be shared by the two multiplier/adder tree structures. Since half the number of multiplications are being performed on each SPIN-E section, the following iteration period can be found using the same delay restrictions as SPIN:

$$SPIN\text{-}2 \ period = \frac{N}{2} \delta_M + (\log_2 N)\delta_A + \delta_S + \delta_{B2} + \delta_{PE} + 2$$

As E is made larger the synchronization time must be considered. Under the SPIN timing restrictions the fastest a Y value can be produced is once every multiplier delay time, $\delta_M$. Let $\delta'_M$ be a dimensionless quantity numerically equal to the multiplier delay then the synchronization time must be considered on each group of E Y values produced when $E > \delta'_M$. When $E > \delta'_M$ either the processing must be held up or sufficient buffers be placed in the synchronization unit. Since $E > \delta'_M$ implies a very large system whose performance would be greatly impacted due to the synchronization problem only the performance of SPIN-E when $E \leq \delta'_M$ will be considered. In general as the number of SPIN sections are repeated the following period would be obtained:

FOR $E \leq \delta'_M$:

$$\text{SPIN-}E\text{period} = \frac{N}{E}\delta_M + (\log_2 N)\delta_A + \delta_S + \delta_{B2} + \delta_{PE} + EC \quad (9)$$

In comparing the performance of SPIN-E with SPIN the performance advantage is given by:

$$\text{Performance Improvement} = \frac{(\text{SPIN PERIOD})}{(\text{SPIN-}E\text{ PERIOD})}$$

For E small, substituting equations 8 and 9 in gives:

$$\text{Performance Improvement} = \frac{(N\delta_M + (\log_2 N)\delta_A + \delta_S + \delta_B + \delta_{PE})}{((N/E)\delta_M + (\log_2 N)\delta_A + \delta_S + \delta_B + \delta_{PE} + EC)}$$

As N grows larger $N\delta_M >> ((\log_2 N)\delta_A + \delta_S + \delta_B + \delta_{PE})$ and if E is small compared to N then $(N/E)\delta_M >> (\log_2 N\delta_A + \delta_S + \delta_B + \delta_{PE} + EC)$ which leads to:

$$\text{Performance Improvement} \approx \frac{(N\delta_M)}{((N/E)\delta_M)}$$

Performance Improvement $\approx$ E

For E=2 the performance improvement would tend to 2 as N increased in size.

- SPIN-IP: SPIN with INCREASED PARALLELISM DESCRIPTION

The SPIN performance can be improved even further by duplication of the unpipelined multipliers and sigmoid generators, FIG. 10 SPIN-IP. In fact SPIN-IP allows the removal of the constraint that $\delta_S \leq \delta_M$ and the need for a separate bus for each sigmoid generator if certain restrictions in how the sigmoid generators are used are met. The improved performance is obtained with A * N multipliers and B sigmoid generators where A is a dimensionless number equal to the multiplier clock cycle delay and B is a dimensionless number equal to the sigmoid clock cycle delay. For example if the multiplier delay is 32 clock cycles long A=32 and if the sigmoid generator is 64 clock cycles long B=64. By having a common input to the sigmoid generators with sequential non overlapping summation value inputs, the constraint of $\delta_S \leq \delta_M$ can be removed. From the SPIN-E discussion, B sigmoid generators implies B buses but this is not the case in SPIN-IP since the Y values produced from the B sigmoid generators are not produced in parallel as they are in SPIN-E. Rather the SPIN-IP sigmoid generators sequentially produce the Y values one clock cycle apart from each other. Consequently a single L bit wide parallel tri-state bus can be used.

For a bit-serial design the summation structure must also be adapted to accommodate the increased parallelism. To accomplish a bit-serial design which removes the $\delta_S \leq \delta_M$ constraint and the requirement of a bus for each sigmoid generator, requires that the bit-serial multiplier or adder tree values be accumulated into a bit-parallel form and applied to the sigmoid generator inputs at a one value per clock cycle rate. This allows the sigmoid generators to produce one Y value per clock cycle. Either "A" adder trees made up of 2 to 1 bit serial adders or one adder tree accommodating "A" bit wide values from each multiplier must be used. To minimize the adder stage delay "A" adder trees made up of 2 to 1 adders would be used and the bit-serial summation values accumulated prior to entering the sigmoid generators. In a word parallel approach a single adder tree would be used since it requires less hardware than "A" word wide adder trees and since there is no distinction in the adder stage delay between the two possible word parallel tree implementations.

The HOST interface, which would function in the same manner as SPIN, has been removed for clarity from the SPIN-IP FIG. 10. From a bit-serial perspective FIG. 10 depicts an implementation where the bit-serial products are accumulated prior to entering the adder tree, which is shown structured in a word parallel format.

From FIG. 10 it can be seen that the multiplier inputs have been expanded to include A multipliers per input with each multiplier feeding an A to 1 multiplexor labeled MPX. The MPX output feeds the standard $\log_2 N$ adder tree. Alternatively, in a bit-serial design instead of accumulating the products prior to entering a single adder tree through multiplexors, "A" adder trees could be provided with bit accumulators located at their outputs. The accumulated outputs would then be distributed to the B sigmoid generators, which could be accomplished, for example, by using a common tri-state bus tied to all B sigmoid generator inputs. As presented in FIG. 10, the output of the adder tree fans out to B sigmoid generators whose outputs are connected to a single L bit wide tri-state bus. For simplicity of discussion assume N/A is an integer number as is assumed for the weights storage shown in FIG. 11. Assuming the HOST interface initializes SPIN-IP in a similar manner as SPIN, the following operation sequence occurs. The weight values can be seen in FIG. 11. After the START signal has been generated, the initial Y values are transferred to the first multiplier cell beginning the first column of multiplications:

First Column MPY1s = $Y_1 W_{1,1}, Y_2 W_{1,2}, \ldots, Y_N W_{1,N}$

The next clock cycle shifts the Y values to the next multiplier input cell to begin the second column of multiplications:

Second Column MPY2s = $Y_1 W_{2,1}, Y_2 W_{2,2}, \ldots, Y_N W_{2,N}$

Each clock cycle the Y values are shifted to the next multiplier input cell until after the $A^{th}$ clock each multiplier cell will have received a Y value input. The $A^{th}$ column of multiplications will begin:

Ath Column MPYAs=$Y_1W_{A,1}, Y_2W_{A,2}, \ldots, Y_NW_{A,N}$

After the $A^{th}$ clock cycle the first column of multipliers will have completed their multiplication and sent the result to the A to 1 multiplexors which gate the values onto the adder tree. The multiplexors are then switched the next clock cycle to allow the second column multiplication results to enter the add tree. With this approach it is required that the add stage delay be one clock cycle long. After each column of multiplications are completed, each column of multipliers begins their next multiplication. In this manner, after the initial $\delta_M$ delay, all succeeding multiplication results enter the adder tree at a rate of one per clock cycle. The summation results from the adder tree, bit accumulated result in the case of a bit-serial design, will be generated also at a rate of 1 summation result per clock cycle after the initial $\delta_M+\delta_{mpx}+(\log_2 N)\delta_A$ delay to fill the pipeline. Since the sigmoid generators are assumed to have a delay greater than one clock cycle, multiple sigmoid generators are placed in parallel to handle the incoming inputs. A simple ordered sequential selection control of the sigmoid generators ensures they are started correctly. The sigmoid generators will then produce a Y value every clock cycle after the its initial sigmoid delay. Since the Y values are sequentially produced from the B sigmoid generators, the generators' outputs can use a single common tri-state bus with a sequential control enabling one Y value on the bus per clock cycle. The sigmoid output bus is assumed to be L bits wide and connected to the PE with the $N^{th}$ tag. The outputs are produced in sequential order $Y_1, Y_2, \ldots, Y_N$ in the same manner as SPIN such that only after the $N^{th}$ Y value has been received can the next update cycle begin.

- SPIN-IP PERIOD CALCULATION

There is a delay time associated with either the use of a multiplexor at the adder tree input or the use of a tri-state bus with "A" adder trees providing a multiplexor function at the adder tree outputs. This time is denoted as $\delta_{mpx}$ and is treated as part of the pipeline, It can be shown that SPIN-IP's period is:

SPIN-IP
period=$\delta_M+\delta_{mpx}+(\log_2 N)\delta_A+\delta_S+\delta_B+\delta_{PE}+(N-1)C$ (10)

In comparing the SPIN-IP with SPIN-E, $E=\delta'_M$, the performance advantage is given by:

$$\text{Performance Improvement} = \frac{(\text{SPIN-}IP \text{ PERIOD})}{(\text{SPIN-}E \text{ PERIOD})}$$

Assuming equivalent bus delays and by substituting equation 9 with $E=\delta'_M$ and equation 10 gives:

$$\text{Performance Improvement} = \frac{(\delta_M+\delta_{mpx}+(\log_2 N)\delta_A+\delta_S+\delta_B+\delta_{PE}+(N-1)C)}{\left(\frac{N}{\delta'_M}\delta_M+(\log_2 N)\delta_A+\delta_S+\delta_B+\delta_{PE}+\delta'_MC\right)}$$

Assume:
$\delta_{mpx}=1$ $\delta_S+\delta_B+\delta_{PE}=K$
Then:

$$\text{Performance Improvement} = \frac{(K+\delta_M+(\log_2 N)\delta_A+NC)}{(K+NC+(\log_2 N)\delta_A+\delta'_MC)} = 1$$

Where: C=clock cycle.
SPIN-IP has equivalent performance to SPIN-E when $E=\delta'_M$.

It should be noted that equivalent performance to SPIN-IP can be obtained in a L bit parallel design, as opposed to a bit-serial design or a design with unpipelined multipliers and sigmoid generators, by pipelining the multipliers and sigmoid generator, "A" stages for the multiplier and "B" stages for the sigmoid generator. Each stage delay in the multiplier, adder tree, and sigmoid generator are assumed equal. With pipelining there is a requirement for only one sigmoid generator. In addition no multiplexors are required at the adder tree input. The processor will produce the Y values sequentially in order in the same manner as SPIN-IP. The high level structure for this fully pipelined approach is shown in FIG. 12 SPIN-IP2.

- SPIN-IP2 PERIOD CALCULATION

SPIN-IP2
period=$\delta_M+(\log_2 N)\delta_A+\delta_S+\delta_B+\delta_{PE}+(N-1)$ (11)

- SPIN-EXP:SPIN-EXP DESCRIPTION

The SPIN design as extended under the acronym SPIN-E with E parallel elements has a performance gain which approaches E for large N and small E as compared with to SPIN. SPIN-E requires, for example, E*N multipliers, E adder trees, E sigmoid generators, and an interconnection network of E buses. SPIN-IP requires A*N multipliers, A adder trees, B sigmoid generators, and 1 bus. Either approach requires a great deal of hardware. Another approach has been investigated, under the acronym SPIN-EXP, which provides an alternative producing better performance than that already described with the systolic array neural network for less hardware. This new structure will also be able to allow a range of performance varying with the amount of parallelism and associated hardware cost incorporated in the system. SPIN-EXP will in the limit become the SPIN-E structure with its associated performance gain.

SPIN-EXP consists of E PN elements, X replicated input multiplier sections contained in the E-1 additional PNs, and producing P neuron values from the additional parallel PNs. This structure is shown in FIG. 13 for E=2, X=1, and P=1.

For PN-1 of SPIN-EXP, FIG. 13, the neuron values $Y_1, Y_2, \ldots, Y_{N-1}$ are sequentially output from the one PN. Each value is tagged and then placed on the bus. The input PE's function in the same manner as already described for the basic SPIN structure. The "START" signal can be the result of a counter comparison circuit which ensures no new activity occurs until all N neuron values have been received from the buses. The "START" signal ensures the SPIN-EXP PN processors functions in each iteration cycle just as it did on initialization with the only exception being in how the neuron values were obtained, at initialization from the host computer and during execution internally processed.

With the PN-2 indicated in FIG. 13, PE-A receives the PN-1's tagged values and stores them in a queue. The two PE-N's, one in PN-1 and one in PN-2, receives PN-2's output which in this case, P=1, is the N$^{th}$ output for the modeled network structure. PN-2's PE-N stores the N$^{th}$ value in the PN-2's queue after the other PN-1 (N-1) tagged values. PN-2 does a sequential multiply of the neuron Y values from the queue with their associated weights and iteratively adds the products. The final iterative sum represents the summation of all weighted inputs for the N$^{th}$ neuron and this value is then forwarded to the sigmoid generator to develop the $Y_N$ value. The PN-2 $Y_N$ value goes only to two PE's one in PN-1 and one in PN-2. The next network update cycles for PN-2 are controlled by the "START" signal in the same manner as the PN-1 processor. FIG. 14 depicts the queue based neural element in more detail. The Y value QUEUE storage is made up of two storage arrays, termed a butterfly queue in FIG. 14. The Y values for a present update cycle are kept in one of the arrays, for example Q1, while the other array, for example Q2, is updated with the new Y values to be used in the next network update cycle. When the next cycle is "START"ed then the queue buffers are switched such that the new Y values, Q2 in the example, are used in the next update cycles while the other queue, in this case Q1, begins to load the next cycle's Y values. The queue buffers switch each update cycle. The HOST will initially store the first neuron values and all weights in the QUEUE and weight arrays. After initialization, SPIN-EXP is "START"ed and the tagged Y values from PN-1 are sequentially output. The tags act as an address into the QUEUE where the Y values are to be written. The $Y_N$ value, produced from PN-2, will be stored at the N$^{th}$ address. The PN-2's weight array address generator will produce the address for all PN-2 weight arrays and QUEUEs during execution of the network. This ensures that $Y_j$ is properly paired with $W_{ij}$ as input to the multiplier. Located after the multiplier is an iterative adder made up of a single adder with a storage element which provides the accumulating sum function. Prior to starting the summation process the iterative adder storage element must be initialized to zero which is added to the first multiplier product. After completion of the second multiplication, the first product, stored in the adder storage element, and the second multiplication result can be added. This summation, the first of N-1 summations, is stored in the adder storage element such that a running sum of the weight times neuron value products is obtained. These iterative adds can occur in parallel with the multiplication operations. The final accumulated sum then becomes the input to the sigmoid function which computes the new neuron output. The tag generation must take into account the number of neuron values the PN-2 section will handle. This is governed by the variable P, available from a HOST loaded register. PN-1 will output $Y_1, Y_2, \ldots, Y_{N-P}$ while PN-2 will output only $Y_{N-P+1}, Y_{N-P+2}, \ldots, Y_N$.

The PN-2 structure allows increased parallelism such that the performance can be improved with minimum additional hardware. An example of increasing the parallelism in PN-2 is shown in FIG. 15: (Note that the host interface has been removed for clarity.) In FIG. 15 the input multiplier section of FIG. 13's PN-2 has been replicated allowing PN-2 to improve its performance to handle P=2 outputs, $Y_{N-1}$, and $Y_N$. The number of replicated input multipliers is denoted by X. The size of the Queues for each multiplier input will be reduced as X increases. For example with X=1 the single butterfly queues will contain N Y value entries each, for X=2 each of the 2 butterfly queues will contain N/2 Y value entries each, ..., for X=N the Queues will become Y value registers. The structure for X=N would not require the iterative adder in PN-2 nor the additional Y value registers as these can be shared from PN-1 such that the PN-2 structure would become a duplicate of PN-1 and the whole PN-1/PN-2 structure becomes SPIN-E with E=2 as shown in FIG. 9.

- SPIN-EXP PERIOD CALCULATION

The period calculations will be based on the increased parallelism in PN-2 as shown in the example of FIG. 12 where X=2. The equations will then expanded to X in general. The following new variables are used in the SPIN-EXP analysis:

$\delta_{Qr}$=SPIN-EXP Queue read access delay.
$\delta_{Qw}$=SPIN-EXP Queue write delay.

New general assumptions and other notation include the following:

1. $\delta_{Qr} \leq \delta_M$ The Queue read access delay must be less than the multiplier delay.
2. $\delta_{Qw} \leq \delta_M$ The Queue write delay must be less than the multiplier delay.
3. In SPIN, SPIN-E, and SPIN-EXP PN-1 the number of stages in the adder tree is $\log_2 N$, where N is the total number of neurons to be simulated and equal to the number of SPIN inputs.
4. In SPIN-EXP's PN-2 the number of stages in the adder tree is $\log_2 X$, where X is the number of replicated input multiplier sections.

- FOR PN-1

The PN-1 section of SPIN-EXP produces Y values in the same manner as SPIN, having a timing equation of the form:

$$(Y_i)_d = (i)\delta_M + (\log_2 N)\delta_A + \delta_S + \delta_{B2} + \delta_{PE}$$

For SPIN-EXP PN-1 produces N-P values such that the (N-P)$^{th}$ value is:

$$(Y_{N-P})_d = (N-P)\delta_M + (\log_2 N)\delta_A + \delta_S + \delta_{B2} + \delta_{PE}$$

- FOR PN-2

$$(Y_1 W_{N-1,1})_d = \delta_M$$

$$(Y_2 W_{N-1,2})_d = \delta_M$$

$$(Y_3 W_{N-1,3})_d = 2\delta_M$$

$$(Y_4 W_{N-1,4})_d = 2\delta_M$$

$$\vdots$$

$$(Y_{N-1} W_{N-1,N-1})_d = N/2\delta_M$$

$$(Y_N W_{N-1,N})_d = N/2\delta_M$$

In terms of $X$ the last two multiplications would be:

$$(Y_{N-1} W_{N-1,N-1})_d = N/X\delta_M$$

$$(Y_N W_{N-1,N})_d = N/X\delta_M$$

- FOR THE SUMMATION TREE AND ITERATIVE ADD $(Y_1 W_{N-1,1} + Y_2 W_{N-1,2})d =$
$\text{SUM1} = \delta_M + (\log_2 2)\delta_A + \delta_A$ $(\text{SUM1} + Y_3 W_{N-1,3} + Y_4 W_{N-1,4})d =$
$\text{SUM2} = 2\delta_M + (\log_2 2)\delta_A + \delta_A$ $$\left( \sum_{j=1}^{N} Y_j W_{N-1,j} \right)_d = N/2 \delta_M + (\log_2 2)\delta_A + \delta_A$$

In terms of X the last summation would be:

$$\left( \sum_{j=1}^{N} Y_j W_{N-1,j} \right)_d = N/X \delta_M + (\log_2 X)\delta_A + \delta_A$$

Combining the $\delta_A$ terms:

$$\left( \sum_{j=1}^{N} Y_j W_{N-1,j} \right)_d = N/X \delta_M + (1 + \log_2 X)\delta_A$$

The $(N-1)^{th}$ neuron output Y value can now be calculated:

$$(Y_{N-1})_d = F\left( \sum_{j=1}^{N} Y_j W_{N-1,j} \right)_d = (N/X)\delta_M + (1 + \log_2 X)\delta_A +$$

$$\delta_S + \delta_{B2} + \delta_{PE}$$

The $P^{th}$ Y value from PN-2 or in this case the $Y_N$ value from PN-2 has the following timing:

$$(Y_N)_d = P(N/X)\delta_M + (1 + \log_2 X)\delta_A + \delta_S + \delta_{B2} + \delta_{PE} \quad (13)$$

PN-2 produces P neuron values with the X replicated input multiplier sections. In order to improve performance of SPIN-EXP over the previous approaches, it is desired that the last neuron value produced from PN-2 be generated at the same time or in less time than the N-P neuron value is produced from PN-1. Setting equation 12 $\geq$ to equation 13 results in:

$(N-P)\delta_M + (\log_2 N)\delta_A + \delta_S + \delta_{B2} + \delta_{PE} \geq P(N/X)\delta_M$
$+ (1 + \log_2 X)\delta_A + \delta_S + \delta_{B2} + \delta_{PE}$ Simplifying:

$(N-P)\delta_M + (\log_2 N)\delta_A \geq P(N/X)\delta_M + (1 + \log_2 X)\delta_A$ Solving for P gives:

$$P \leq X \frac{((\log_2 N - \log_2 X - 1)\delta_A + N\delta_M)}{(N + X)\delta_M} \quad (14)$$

For X=1, P is:

$$P \leq \frac{((\log_2 N - 1)\delta_A + N\delta_M)}{(N + 1)\delta_M}$$

Solving for N when P=1 gives the minimum value for N in terms of the multiplier and adder delays:

$$N \geq 2^{(\delta_M + \delta_A)}/\delta_A \quad (15)$$

Assuming an adder delay of one clock cycle, i.e. $\delta_A = 1C$ and substituting into equation 15 gives:

$$N = 2^{\delta'_M + 1}$$

Where $\delta'_M$ = the dimensionless numeric value of $\delta_M$. This exponential increase in N as the multiplier delay increases is due to the structure of PN-2 FIG. 13. With P=1 the overall system performance is throttled by the PN-2 delay, since PN-1 cannot begin processing the next values until all present iteration values have been received, i.e. those from PN-2. Repeating equation 12 for PN-1 and setting P=1:

$$(Y_{N-1})_d = (N-1)\delta_M + (\log_2 N)\delta_A + \delta_S + \delta_{B2} + \delta_{PE} \quad (16)$$

Repeating the ring systolic array neural network equation 3:

SYSTOLIC RING period = $N\delta_M + \delta_A + \delta_{B1} + \delta_S$

For P=1 equation 16 is very close to the systolic ring neural network performance equation, which indicates that the performance is still approximately equivalent with the ring systolic array approach.

With X=N no iterative adder delay would be required just an adder tree and the PN-2 would become a duplicate of PN-1. For this case X=N, P would be:

$$P \leq N \frac{((\log_2 N - \log_2 N)\delta_A + N\delta_M)}{2N\delta_M}$$

$$P \leq \frac{N}{2}$$

Therefore as X approaches N the performance will double and the circuit will become that as already described SPIN-E, E=2.

As X increases a more viable method of implementing SPIN-EXP would be to share the Y value registers between the PNs and use N/X to 1 multiplexors to provide PN-2's multipliers' inputs. This structure is shown in FIG. 16 where X=N/2. Assuming the multiplexors, acting as a simple switch in this case, represents negligible delay and do not impact the critical timing path, the timing equation for PN-2 remains the same as equation 13. For a bit-serial design, assuming the Y values are shifted into the multipliers and recirculated in the Y value registers, then only X N/X to 1 single bit multiplexors would be required adding little to the overall hardware costs.

- SPIN-EXP PERFORMANCE COMPARISON

The sigmoid generator is a complex function which would typically take more hardware to implement than would a multiplier or adder. Even so, considering a worst case hardware scenario that the sigmoid generator, multiplier with its input registers, and adder each take the same amount of hardware, what performance could be obtained from a SPIN-EXP structure which contains approximately the same hardware as the ring systolic array neural network? Since both structures require the same amount of weight storage, we will examine the total quantity of multipliers, adders, and sigmoid generators used in both designs. The difference in sigmoid generators will be used for additional multipliers and adders in SPIN-EXP.

First of all, let N=1024:

For the ring systolic array the following costs are assumed:
- 1024 multipliers
- 1024 adders
- 1024 sigmoid generators The ring systolic array neural network has a total of 3072 elements.

Consider a SPIN-EXP structure containing E=2 sigmoid generators:
- 1024+X multipliers
- 1024+X−1 adders
- 2 sigmoid generators There is a difference of N-2 or 1022 sigmoid generators between the two architectures. For SPIN-EXP the total number of elements is:

NUMBER OF SPIN-EXP ELEMENTS = 2049 + 2X

Under the assumptions of hardware costs, the number of elements for both designs can be equated and then the resulting equation solved for X.

$$3072 = 2049 + 2X$$

$$X = 512$$

Equation 14, repeated here, can now be used to solve for P:

$$P \leq X \frac{((\log_2 N - \log_2 X - 1)\delta_A + N\delta_M)}{(N + X)\delta_M}$$

$$P \leq 512 \frac{(1024)}{(1024 + 512)}$$

$$P \leq 341.3$$

Using P=341 and X=512 we will verify the relationship between PN-1, equation 12, and PN-2, equation 13, of SPIN-EXP. Setting equation 12 ≧ to equation 13 and subtracting the common terms results in:

$$(1024-341)\delta_M + (\log_2 1024 -)\delta_A \geq 341(1024/512)\delta_M + (1+\log_2 512)\delta_A$$

Simplifying:

$$(683)\delta_M + (10)\delta_A \geq (682)\delta_M + (10)\delta_A$$

The inequality holds so SPIN-EXP will function correctly. Now that the two hardware models are approximately equal, under the worst case assumptions, the performance improvement can be calculated.

$$\text{Performance Improvement} = \frac{(\text{SYSTOLIC RING PERIOD})}{(\text{SPIN-2,512,341 PERIOD})}$$

Substituting equations 3 and 12 in, and letting $\delta_{B1} = \delta_{B2} = \delta_B$ gives:

$$\text{Performance Improvement} = \frac{(N\delta_M + \delta_A + \delta_S + \delta_B)}{((N-P)\delta_M + (\log_2 N)\delta_A + \delta_S + \delta_B + \delta_{PE})}$$

Substituting N=1024 and P=341 gives:

$$\text{Performance Improvement} = \frac{(1024\delta_M + \delta_A + \delta_S + \delta_B)}{((683)\delta_M + (10)\delta_A + \delta_S + \delta_B + \delta_{PE})}$$

For N large $N\delta_M >> (\delta_A + \delta_S + \delta_B)$ and for $(N-P)\delta_M >> ((\log_2 N)\delta_A + \delta_S + \delta_B + \delta_{PE})$ which leads to:

$$\text{Performance Improvement} \simeq \frac{N}{(N-P)}$$

Which for our example gives a performance improvement of:

$$\text{Performance Improvement} \simeq \frac{1024}{683} \simeq 1.5$$

Since the sigmoid generator is a more complex function than assumed in this example, the 1.5 performance improvement represents a lower bound over what could be more realistically attained.

COMPARISONS

FIG. 17 presents the hardware and performance comparison of the architectures discussed in this discussion, assuming all parameters are a power of 2.

WHERE:
N = number of physical neurons modeled.
E = number of PN elements.
X = number of replicated input multiplier sections.
P = number of neuron values produced from the replicated parallel PN's.
A = dimensionless number equal to the multiplier delay as measured in clock cycles.
B = dimensionless number equal to the sigmoid delay as measured in clock cycles.
C = unit representing the system clock cycle.

A hypothetical system clock cycle comparison between the architectures will be presented, Table 1, under the following assumptions: (For valid comparisons keep $\delta_S \leq \delta_M$).

$\delta_M = 64$.
$\delta_S = 64$.
$\delta_A = 1$.
$\delta_B = 1$.
$\delta_{mpx} = 1$.
$\delta_{PE} = 1$.

The SPIN architecture, four extended versions, SPIN-E, SPIN-IP, SPIN-IP2, and SPIN-EXP, plus a fifth virtual extension to SPIN termed VSPIN, have been reviewed. The ring systolic array neural network has been discussed and a comparison made between it and the SPIN architectures. From this review the following can be concluded:

SPIN and its extended versions allows for a wide range of implementations with varying performance/cost trade-offs.

The N neuron SPIN tagged architecture allows close to full performance for networks of (m) neurons where m<N. The slight difference between a $\log_2 N$ adder tree instead of a $\log_2 m$ adder tree represents the only limiter to achieving full performance. No structural changes are required to achieve the performance across the range M≦N.

The architecture is extendable for virtual implementations of networks where the number of neurons (m) is larger than the number of neurons N SPIN directly supports.

SPIN is implementable in either a bit-serial or word parallel approach.

SPIN-IP provides superior performance as compared to SPIN and equivalent performance to an implementation of SPIN-E with $E = \delta'_M$ while removing the $\delta_S \leq \delta_M$ and one bus per sigmoid generator restrictions.

For large N, the performance of SPIN is approximately the same as the ring systolic array neural network performance but requires N-1 less sigmoid generators representing a considerable hardware savings.

For a worst case comparison of equivalent hardware, as presented here, SPIN-EXP offers an approximately 1.5 times performance improvement over the ring systolic array neural network.

While we have described our preferred embodiments of our inventions it will be understood that those skilled in the art, both now and in the future, upon the understanding of these discussions will make various improvements and enhancements thereto which fall within the scope of the claims which follow, which claims should be construed to maintain the proper protection for the inventions first disclosed.

What is claimed is:

1. A sequential pipelined neural computer apparatus comprising:

N Processing Elements (PEs), each including storage for a neuron value and for a PE tag, tag matching means for comparing a tag identifying a new neuron value with the PE tag, means for storing the new neuron value as the neuron value of the PE if the tag of the new neuron value matches the PE tag, and N-1 of the PEs having means for passing the new neuron value to a next one of the PEs if the tag identifying the new neuron value does not match the PE tag;

N weight storage units, each associated with a respective one of the PEs, and each storing a plurality of weight values;

N multipliers, each associated with a respective one of the weight storage units, and each for producing as an output the product of one of the weight values of said respective one of the weight storage units and the neuron value of said respective one of the PEs associated with said respective one of the weight storage units;

a summation tree for adding the outputs of the multipliers to produce a sum;

a neuron activation function generator, for receiving the sum and generating therefrom a new neuron value; and means for communicating the generated neuron value from the generator to one of the PEs as the new neuron value.

2. The apparatus according to claim 1 wherein the neuron activation function is a nonlinear sigmoid generator.

3. The apparatus according to claim 1 wherein the summation tree contains $\log_2 N$ 2 to 1 adder stages.

4. The apparatus according to claim 3 further comprising means for pipelining the summation tree to allow a new summation process to start prior to a previous summation finishing on the tree.

5. The apparatus according to claim 1 wherein the means for communicating is a bus comprising a packet of neuron information made up of the neuron value, a Source tag, a Valid signal, and a host-only controlled Weight bit.

6. The apparatus according to claim 5 further comprising a pipeline control mechanism for generating the Valid signals and Source tags to be communicated in synchronism with the neuron value on the bus.

7. The apparatus according to claim 1 further comprising a host interface control for providing:

a separate interface to a host computer, and means for attaching the host computer to the means for communicating for initialization of the apparatus, and for access to the weight values and the neuron values.

8. The apparatus according to claim 1 wherein the weight storage units have:

means for addressing the N weight values, a common N address generator for all weight arrays, wherein said address generator provides a Nth event output to indicate a Nth update cycle.

9. The apparatus according to claim 1 comprising means for sequentially generating and outputting the new neuron values onto the means for communicating in an order specified by the PEs' stored tags.

10. The apparatus according to claim 1 further comprising a valid bit placed on the means for communicating with the new neuron value and its identifying tag for one control period to ensure that only valid and stable neuron information is communicated.

11. The apparatus according to claim 1 further comprising means for inactivating the means for storing the new neuron values.

12. The apparatus according to claim 1 further comprising means for indicating that a last new neuron value has been communicated to the one of the PEs to indicate when a next set of parallel multiplications can be started.

13. The apparatus according to claim 1 wherein the means for comparing in the PEs is eliminated and the new neuron values are stored as the neuron value of the PE upon an indication from a counter mechanism.

14. The apparatus according to claim 1 further comprising an accumulating adder connected to the summation tree.

15. The apparatus according to claim 14 wherein said accumulating adder contains (m) storage elements, a Partial Sum Array, for storing (m) Partial Summation (PS) values, and where the neuron activation function generator is not engaged until a full input summation dictated by $$Y_i = F\left(\sum_{j=1}^{N} Y_j W_{ij}\right)$$

is met.

16. The apparatus according to claim 14 wherein there is provided an expanded weight array for larger networks containing (m) neurons, and wherein an apparatus control structure is provided to follow an operation sequence for a given size of weight memory. MEM weights, whereby at each of N apparatus inputs and for a given N, neural networks where m>N can be executed, the size of (m) is given by: $m = \sqrt{(N(MEM))}$ and wherein there are a possible $m^2$ weights in a completely connected (m) neuron network and the $m^2$ weights are divided among the N apparatus inputs.

17. The apparatus according to claim 16 further comprising means for sending all the neuron values to a HOST which would initialize the PEs with corresponding neuron values and START the network.

18. The apparatus of claim 1 connected in parallel with E-1 substantially similar apparatuses, and further comprising an interconnection network of E buses, and means for controlling.

19. The apparatus according to claim 18 wherein the E parallel apparatuses share PEs in a serially connected N PE structure such that the PE's storage for a neuron value is connected in parallel to their corresponding multiplier inputs in the E parallel apparatuses.

20. The apparatus according to claim 19 wherein there is a synchronization mechanism, provided as input to the serially connected N PEs, that orders neuron value outputs obtained from the E buses and inputs the ordered neuron value to the means for passing the neuron value.

21. The apparatus according to claim 18 further comprising a bus containing N/E Y-values produced by the parallel apparatuses' neuron activation functions.

22. The apparatus according to claim 18 further comprising weight storage units containing weight values sequentially ordered such that the neuron outputs are produced in a sequential order for each parallel apparatus identified as PN-K where K is equal to 1, 2, ..., E, and the weight address "i" sequentially varies from 1, 2, ..., N/E to produce Source Tags in each parallel apparatus as given by PN-K Tags equal to K+E(i−1).

23. The apparatus according to claim 1 wherein there are plural unpipelined multipliers and neuron activation functions.

24. The apparatus according to claim 23 wherein there are A*N multipliers and B neuron activation functions, where A is a dimensionless number equal to a multiplier clock cycle delay and B is a dimensionless number equal to a neuron activation function clock cycle delay.

25. The apparatus according to claim 24 wherein N pipelined multipliers and one pipelined neuron activation function are used with A stages in each multiplier and B stages in the single neuron activation function with one bus where A is a dimensionless number equal to the multiplier clock cycle delay and B is a dimensionless number equal to the neuron activation function clock cycle delay.

26. The apparatus according to claim 23 wherein there is a common input to the neuron activation functions with sequential non-overlapping summation value inputs.

27. The apparatus according to claim 23 wherein the neuron activation functions produce neuron values one clock cycle apart from one another, and wherein a single L bit wide parallel bus is provided.

28. The apparatus according to claim 23 further comprising bit serial multipliers and summation tree values and wherein the values are accumulated in the summation tree in bit-serial form and transmitted to the neuron activation function generators at a one clock cycle rate.

29. The apparatus according to claim 23 wherein the summation trees have 2 to 1 adders and bit-serial summation values are accumulated in the tree prior to providing input to the neuron activation function generators.

30. The apparatus according to claim 29 wherein multiple summation trees are provided with bit accumulators located at their outputs, and wherein accumulated outputs of the summation trees are distributed to B neuron activation function inputs.

31. The apparatus according to claim 23 wherein a single summation tree is provided for word parallel processing.

32. The apparatus according to claim 31 wherein there is included A multipliers per input with each multiplier feeding to an A to 1 multiplexor, and the output of the multiplexor provides input to the single summation tree.

33. The apparatus according to claim 1 wherein there are E substantiality similar parallel apparatuses, E buses, X replicated input multiplier sections contained in E-1 apparatuses for producing P neuron values from the E-1 parallel apparatuses, where E, X, and P are integers greater than one.

34. The apparatus according to claim 33 wherein Y, an integer greater than one, neuron values are sequentially output from each apparatus, each value having an identifying tag and placed on the means for communicating.

35. The apparatus according to claim 34 wherein there is provided a queue store, and wherein the values are placed in said queue, and wherein there are means to sequentially multiply the Y neuron values from the queue with their associated weights, and means to sum the products by use of summation trees with iterative adders, whereby a final iterative sum represents the summation of all weighted inputs for a $N^{th}$ neuron and its value is input to a neuron activation function to develop a neuron value.

36. The apparatus according to claim 35 wherein P neuron values are produced from the E-1 parallel apparatuses and N-P neuron values are produced from the $E^{th}$ parallel apparatus.

37. The apparatus according to claim 35 wherein the queue store comprises two storage arrays, and wherein one array keeps present cycle neuron values, and the other is updated with new neuron values used in a subsequent network update cycle.

38. The apparatus according to claim 37 wherein the two storage arrays function as queue buffers which are switched for each update cycle.

39. The apparatus according to claim 33 wherein, for reduced hardware complexity, the neuron value storage are shared between the parallel apparatuses using N/X to 1 multiplexors of negligible delay to provide the input to E-1 parallel apparatus input multipliers.

* * * * *